United States Patent
Yang et al.

(10) Patent No.: US 11,039,186 B2
(45) Date of Patent: Jun. 15, 2021

(54) BROADCAST SIGNAL TRANSMITTING/RECEIVING DEVICE AND METHOD

(71) Applicant: LG ELECTRONICS INC., Seoul (KR)

(72) Inventors: Seungryul Yang, Seoul (KR); Minsung Kwak, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/462,823

(22) PCT Filed: Jul. 6, 2017

(86) PCT No.: PCT/KR2017/007217
§ 371 (c)(1),
(2) Date: May 21, 2019

(87) PCT Pub. No.: WO2018/101566
PCT Pub. Date: Jun. 7, 2018

(65) Prior Publication Data
US 2019/0327500 A1  Oct. 24, 2019

Related U.S. Application Data

(60) Provisional application No. 62/429,087, filed on Dec. 2, 2016, provisional application No. 62/435,084, filed on Dec. 16, 2016.

(51) Int. Cl.
*H04N 21/2389* (2011.01)
*H04N 21/236* (2011.01)
*H04N 21/61* (2011.01)

(52) U.S. Cl.
CPC ....... *H04N 21/2389* (2013.01); *H04N 21/236* (2013.01); *H04N 21/615* (2013.01)

(58) Field of Classification Search
CPC ............ H04N 21/236; H04N 21/2362; H04N 21/4381; H04N 21/615; H04N 21/2381;
(Continued)

(56) References Cited

U.S. PATENT DOCUMENTS

2016/0316473 A1* 10/2016 Wang ................ H04W 74/0816
2018/0206189 A1* 7/2018 Oh ...................... H04W 74/002

FOREIGN PATENT DOCUMENTS

KR    1020100062541 A    6/2010
WO    2016108367 A1    7/2016
(Continued)

OTHER PUBLICATIONS

ATSC Candidate Standard: Signaling, Delivery, Synchronization, and Error Protection (A/331), Jan. 5, 2016, Advanced Television Systems Committee, Doc. S33-174r1, pp. 1-131. (Year: 2016).*

*Primary Examiner* — Muhammad Raza
(74) *Attorney, Agent, or Firm* — Dentons US LLP

(57) ABSTRACT

A broadcast signal transmitting method is disclosed. The broadcast signal transmitting method comprises the steps of: processing at least one component of a broadcast service on the basis of a delivery protocol; generating service layer signaling (SLS) information including information on the component; generating service list table (SLT) information including bootstrap information for acquiring the SLS information; and generating a signal frame including a physical layer pipe (PLP) by performing a physical layer processing on the at least one component, the SLS information and the SLT information.

12 Claims, 21 Drawing Sheets

(58) Field of Classification Search
CPC ............ H04N 21/2389; H04L 27/2602; H04L 1/0057; H04L 1/0041; H04L 1/0071; H04L 5/0091; H04W 72/0453; H04W 74/0816; H04W 24/02; H04W 24/08; H04W 72/0446; H04W 72/082; H04W 84/12

See application file for complete search history.

(56) References Cited

FOREIGN PATENT DOCUMENTS

| | | | |
|---|---|---|---|
| WO | 2016108369 | A1 | 7/2016 |
| WO | 2016111430 | A1 | 7/2016 |
| WO | 2016186407 | A1 | 11/2016 |

* cited by examiner

FIG. 3

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|        SLT | var | Sec. 6.3 |
|        break; | | |
|      case 0x02: | | |
|        RRT | var | See Annex F |
|        break; | | |
|      case 0x03: | | |
|        System Time | var | Sec. 6.4 |
|        break; | | |
|      case 0x04: | | |
|        CAP | var | Sec. 6.5 |
|        break; | | |
|      default: | | |
|        reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcSignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | | | | Use | Data Type |
|---|---|---|---|---|---|
| bundleDescription | | | | | |
| | userServiceDescription | | | | |
| | | @globalServiceID | | 1 | anyURL |
| | | @serviceID | | 1 | unsignedShort |
| | | @serviceStatus | | 0..1 | boolean |
| | | @fullMPDUri | | 1 | anyURL |
| | | @sTSIDUri | | 1 | anyURL |
| | | name | | 0..N | string |
| | | | @lang | 1 | language |
| | | serviceLanguage | | 0..N | language |
| | | capabilityCode | | 0..1 | string |
| | | deliveryMethod | | 1..N | |
| | | | broadcastAppService | 1..N | |
| | | | basePattern | 1..N | string |
| | | | unicastAppService | 0..N | |
| | | | basePattern | 1..N | string |

— t4010

| Element or Attribute Name | | Use | Data Type |
|---|---|---|---|
| S-TSID | | | |
| | @serviceID | 1 | unsignedShort |
| | RS | 1..N | |
| | @bsid | 0..1 | unsignedShort |
| | @sIpAddr | 0..1 | string |
| | @dIpAddr | 0..1 | string |
| | @dport | 0..1 | unsignedShort |
| | @PLPID | 0..1 | unsignedByte |
| | LS | 1..N | |
| | @tsi | 1 | unsignedInt |
| | @PLPID | 0..1 | unsignedByte |
| | @bw | 0..1 | unsignedInt |
| | @startTime | 0..1 | dateTime |
| | @endTime | 0..1 | dateTime |
| | SrcFlow | 0..1 | srcFlowType |
| | RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
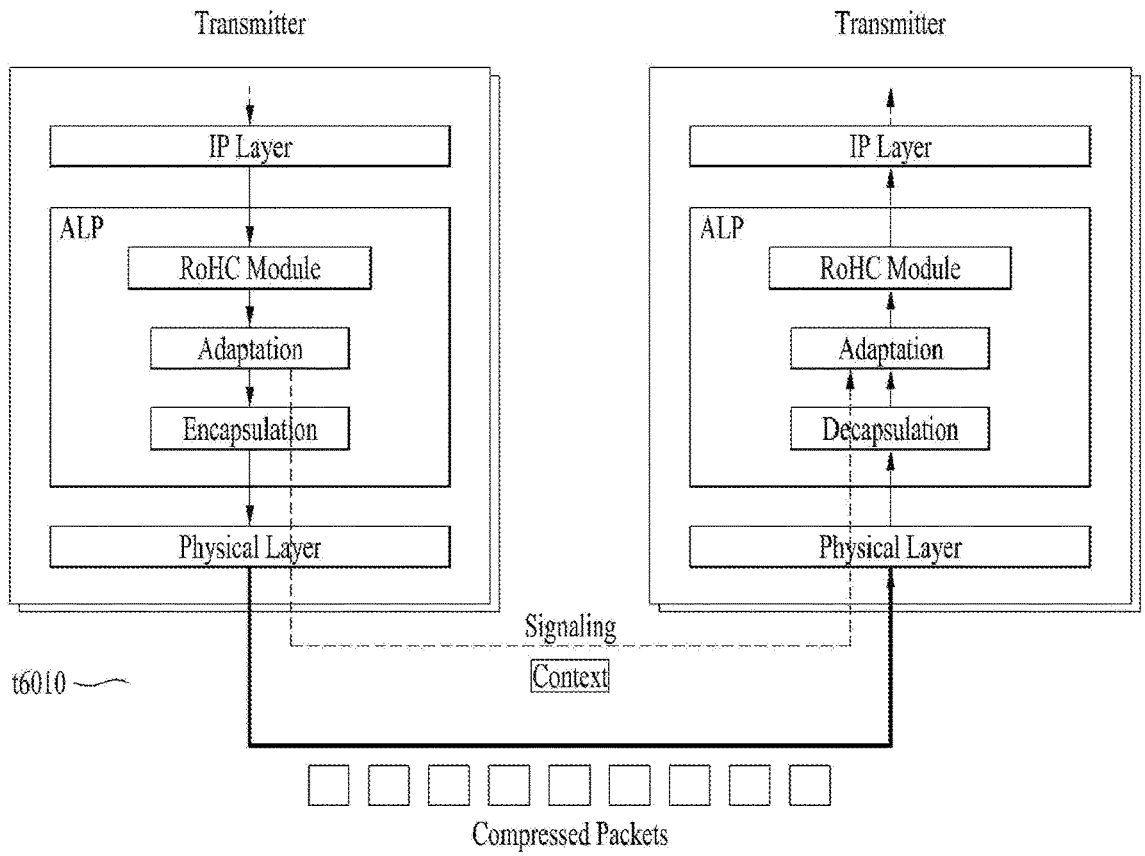
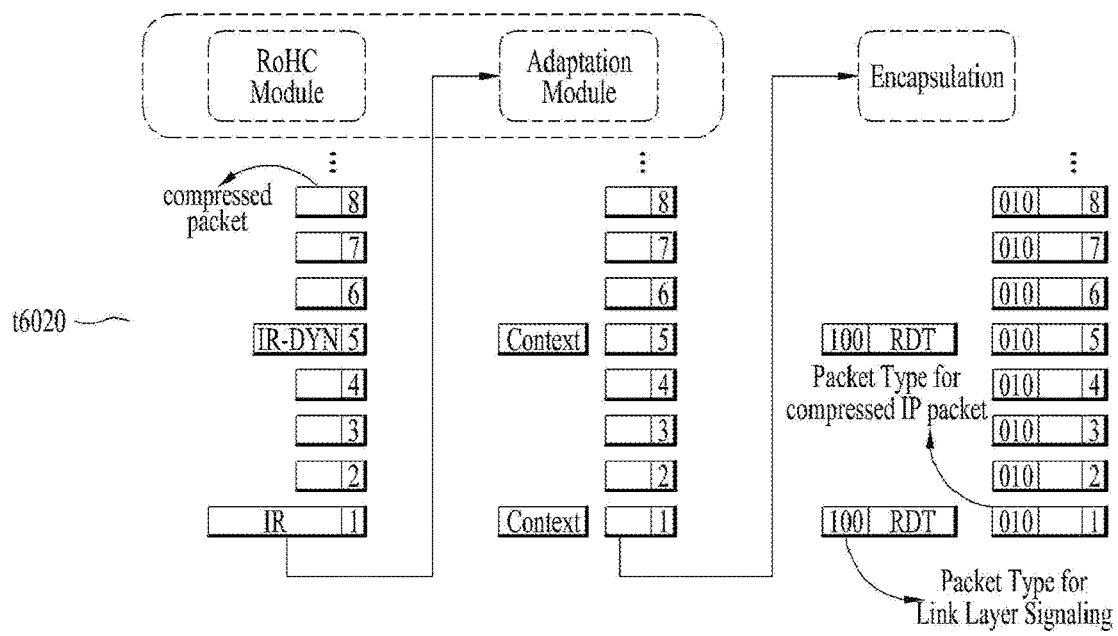

FIG. 7

| Syntax | Number of bits | Format |
|---|---|---|
| Link_Mapping_Table() { | | |
|    signaling_type | 8 | 0x01 |
|    PLP_ID | 6 | uimsbf |
|    reserved | 2 | "11" |
|    num_session | 8 | uimsbf |
|    for(i = 0 ; i < num_session ; i++) { | | |
|       src_IP_add | 32 | uimsbf |
|       dst_IP_add | 32 | uimsbf |
|       src_UDP_port | 16 | uimsbf |
|       dst_UDP_port | 16 | uimsbf |
|       SID_flag | 1 | bslbf |
|       compressed_flag | 1 | bslbf |
|       reserved | 6 | '111111' |
|       if(SID_flag == "1") { | | |
|          SID | 8 | uimsbf |
|       } | | |
|       if(compressed_flag == '1') { | | |
|          context_id | 8 | uimsbf |
|       } | | |
|    } | | |
| } | | |

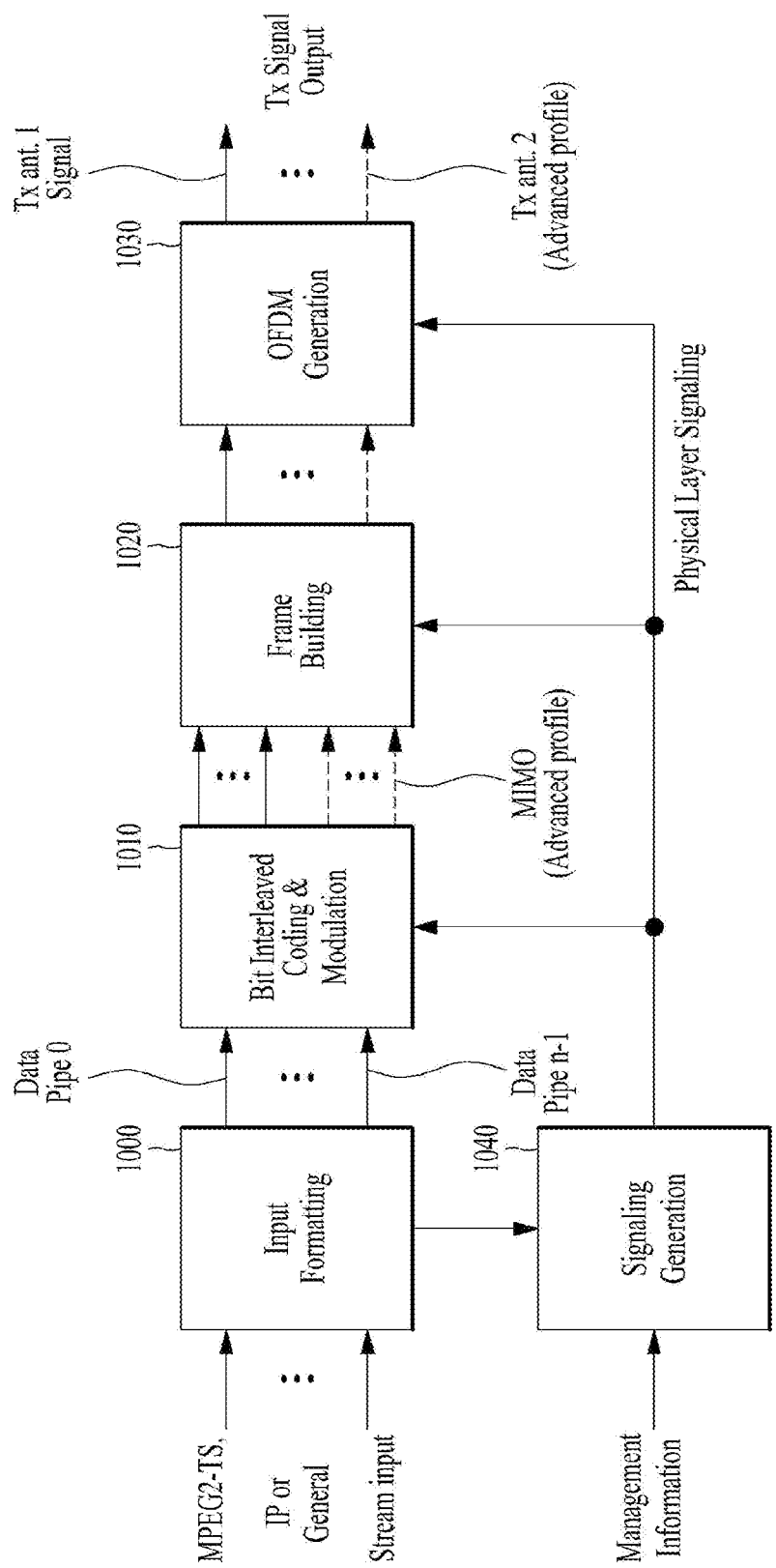

FIG. 9

| Element or Attribute Name | | | | Use | Data Type | |
|---|---|---|---|---|---|---|
| SLT | | | | | | |
| | @bsid | | | 1 | slt:listOfUnsignedShort | |
| | @sltCapabilities | | | 0..1 | string | |
| | sltInetUrl | | | 0..N | anyURI | |
| | | @urlType | | 1 | unsignedByte | |
| | Service | | | 1..N | | |
| | | @serviceId | | 1 | unsignedShort | |
| | | @sltSvcSeqNum | | 1 | unsignedByte | |
| | | @protected | | 0..1 | boolean | |
| | | @majorChannelNo | | 0..1 | 1..999 | |
| | | @minorChannelNo | | 0..1 | 1..999 | |
| | | @serviceCategory | | 1 | unsignedByte | |
| | | @shortServiceName | | 0..1 | string | |
| | | @hidden | | 0..1 | boolean | |
| | | @broadbandAccessRequired | | 0..1 | boolean | |
| | | @svcCapabilities | | 0..1 | string | |
| | | @essential | | 0..1 | boolean | ←9010 |
| | | BroadcastSvcSignaling | | 0..1 | | |
| | | | @slsProtocol | 1 | unsignedByte | |
| | | | @slsMajorProtocolVersion | 1 | unsignedByte | |
| | | | @slsMinorProtocolVersion | 1 | unsignedByte | |
| | | | @slsPlpId | 0..1 | unsignedByte | |
| | | | @slsDestinationIpAddress | 1 | string | |
| | | | @slsDestinationUdpPort | 1 | unsignedShort | |
| | | | @slsSourceIpAddress | 0..1 | string | |
| | | svcInetUrl | | 0..N | anyURI | |
| | | | @urlType | 1 | unsignedByte | |
| | | OtherBsid | | 0..N | slt:listOfUnsignedShort | ←9020 |
| | | | @type | 1 | unsignedByte | ←9030 |

BROADCAST SIGNAL TRANSMITTING/RECEIVING DEVICE AND METHOD

This application is a National Stage Application of International Application No. PCT/KR2017/007217 filed on Jul. 6, 2017, which claims the benefit of U.S. Provisional Application No. 62/429,087 filed on Dec. 2, 2016 and U.S. Provisional Application No. 62/435,084 filed on Dec. 16, 2016, all of which are hereby incorporated by reference in their entirety for all purposes as if fully set forth herein.

TECHNICAL FIELD

The present disclosure relates to a broadcast signal transmission apparatus, a broadcast signal reception apparatus, a broadcast signal transmission method, and a broadcast signal reception method.

BACKGROUND ART

The termination of analog broadcasting is a driving force behind the development of various technologies for transmitting and receiving digital broadcast signals. Compared to an analog broadcast signal, a digital broadcast signal may carry a large amount of video/audio data, and various types of additional data.

DISCLOSURE

Technical Problem

A digital broadcasting system may provide high definition (HD) images, multi-channel audio, and various additional services. For digital broadcasting, however, the transmission efficiency of a large amount of data, the robustness of a transmission/reception network, and network flexibility considering a mobile reception device need to be improved.

Technical Solution

To achieve the above object, the present disclosure proposes a broadcast signal transmission method and a broadcast signal transmission apparatus.

According to an embodiment of the present disclosure, a method of transmitting a broadcast signal includes processing at least one component of a broadcast service based on a delivery protocol, generating service layer signaling (SLS) information including information about the at least one component, the SLS information including service-based transport session instance description (S-TSID) information including description information about a session delivering the at least one component of the broadcast service, generating service list table (SLT) information including bootstrap information for acquiring the SLS information, and generating a signal frame including a physical layer pipe (PLP) by performing physical layer processing on the at least one component, the SLS information, and the SLT information. If components of the broadcast service are transmitted in multiple radio frequency (RF) channels, a set of the components corresponds to a service portion including a part of the components of the service or a service duplicate including all the components of the broadcast service, and the service portion corresponds to an essential portion enabling presentation of the broadcast service without use of the other portions, or a non-essential portion.

In the method of transmitting a broadcast signal according to the embodiment of the present disclosure, if the service portion or the service duplicate of the broadcast service is transmitted in multiple channels, the physical layer processing comprises selectively performing channel bonding by distributing one PLP including the service portion or the service duplicate to a plurality of channels. The service portion or the service duplicate is delivered in a single channel without channel bonding, or in the plurality of channels with channel bonding.

In the method of transmitting a broadcast signal according to the embodiment of the present disclosure, if the service portion or the service duplicate is delivered without channel bonding, an SLT of the channel delivering the service portion or the service duplicate describes the service portion or the service duplicate, and a PLP of each channel delivering the service portion or the service duplicate includes S-TSID information for the service portion or the service duplicate.

In the method of transmitting a broadcast signal according to the embodiment of the present disclosure, if the service portion is delivered with channel bonding, when the essential portion is delivered in a non-bonded PLP, a plurality of pieces of SLT information associated with a non-bonded PLP and a bonded PLP which deliver any portions of the broadcast service list the broadcast service, and only SLT information for the essential portion lists a broadcast stream identifier (BSID) of a broadcast stream delivering another service portion.

In the method of transmitting a broadcast signal according to the embodiment of the present disclosure, if the service portion is delivered with channel bonding, when the essential portion is delivered in a bonded PLP, one piece of SLT information associated with the bonded PLP delivering the essential portion lists the broadcast service, and lists a BSID of a broadcast stream delivering another service portion.

In the method of transmitting a broadcast signal according to the embodiment of the present disclosure, if the service duplicate is delivered with channel bonding, a plurality of pieces of SLT information associated with a non-bonded PLP and a bonded PLP which deliver the service duplicate list the broadcast service, and each of the plurality of pieces of SLT information for the service duplicate lists a BSID of a broadcast stream delivering another service duplicate.

In the method of transmitting a broadcast signal according to the embodiment of the present disclosure, if the components are delivered in a plurality of broadcast streams of multiple broadcast channels, and channel bonding is applied to the components, the S-TSID information describes information about a session and a channel for a component delivered in a broadcast stream other than a broadcast stream delivering the S-TSID information.

Further, according to an embodiment of the present disclosure, a broadcast signal transmission apparatus includes a communication unit configured to transmit a broadcast signal, a memory configured to store data, and a processor configured to control the communication unit and the memory. The broadcast signal transmission apparatus is configured to process at least one component of a broadcast service based on a delivery protocol, to generate SLS information including information about the at least one component, the SLS information including S-TSID information including description information about a session delivering the at least one component of the broadcast service, to generate SLT information including bootstrap information for acquiring the SLS information, and to generate a signal frame including a PLP by performing physical layer processing on the at least one component, the SLS information, and the SLT information. If components of the broadcast service are transmitted in multiple radio frequency (RF) channels, a set of the components corresponds to a service portion including a part of the components of the service or a service duplicate including all the components of the broadcast service, and the service portion corresponds to an essential portion enabling presentation of the broadcast service without use of the other portions, or a non-essential portion.

Advantageous Effects

The present disclosure may provide various broadcast services by processing data according to service characteristics, and thus controlling the quality of service (QoS) of each service or service component.

The present disclosure may achieve transmission flexibility by transmitting various broadcast services in the same radio frequency (RF) signal bandwidth.

The present disclosure may provide a method and apparatus for transmitting and receiving a broadcast signal, which enable reception of a digital broadcast signal without errors even by using a mobile reception device or in an indoor environment.

The present disclosure may effectively support a next-generation broadcast service in an environment supporting next-generation hybrid broadcasting which uses a terrestrial broadcast network and the Internet.

The additional effects of the present disclosure will be described below in conjunction with the construction of the present disclosure.

BRIEF DESCRIPTION OF THE DRAWINGS

FIG. 3 is a diagram illustrating a low level signaling (LLS) table and a service list table (SLT) according to an embodiment of the present disclosure.

FIG. 4 is a diagram illustrating a user service bundle description (USBD) and a service-based transport session instance description (S-TSID), which are delivered over real-time object delivery over unidirectional transport (ROUTE) according to an embodiment of the present disclosure.

FIG. 5 is a diagram illustrating a USBD delivered over MPEG media transport (MMT) according to an embodiment of the present disclosure.

FIG. 6 is a diagram illustrating a link layer operation according to an embodiment of the present disclosure.

FIG. 7 is a diagram illustrating a link mapping table (LMT) according to an embodiment of the present disclosure.

FIG. 8 is a diagram illustrating a configuration of a broadcast signal transmission apparatus for a next-generation broadcast service according to an embodiment of the present disclosure.

FIG. 9 is a diagram illustrating SLT information according to an embodiment of the present disclosure.

BEST MODE FOR CARRYING OUT THE INVENTION

Reference will not be made in detail to the preferred embodiments of the present disclosure, examples of which are illustrated in the accompanying drawings. The following detailed description taken in conjunction with the accompanying drawings is intended to explain the preferred embodiments of the present disclosure, rather than to show the only embodiments in which the disclosure may be practiced. Specific details are set forth in the following detailed description in order to provide a thorough understanding of the present disclosure. However, it is obvious to those skilled in the art that the present disclosure can be practiced without these specific details.

Although most terms used in the present disclosure have been selected from general ones widely used in the art, some terms have been arbitrarily selected by the applicant, and their meanings are explained in detail in the following description as needed. Therefore, the present disclosure should be understood with the intended meanings of the terms rather than their simple names or meanings.

The present disclosure provides an apparatus and method for transmitting and receiving a broadcast signal for a next-generation broadcast service. According to an embodiment of the present disclosure, the next-generation broadcast services may be any of a terrestrial broadcast service, a mobile broadcast service, an ultra-high-definition television (UHDTV) service, and so on. According to an embodiment of the present disclosure, a broadcast signal for a next-generation broadcast service may be processed in multiple input multiple output (MIMO) or non-MIMO. According to an embodiment of the present disclosure, non-MIMO schemes may include multiple input single output (MISO), single input single output (SISO), and so on. The present disclosure proposes an optimized physical profile (or system) that minimizes receiver complexity, while achieving performance required for a specific purpose.

Figure 1:
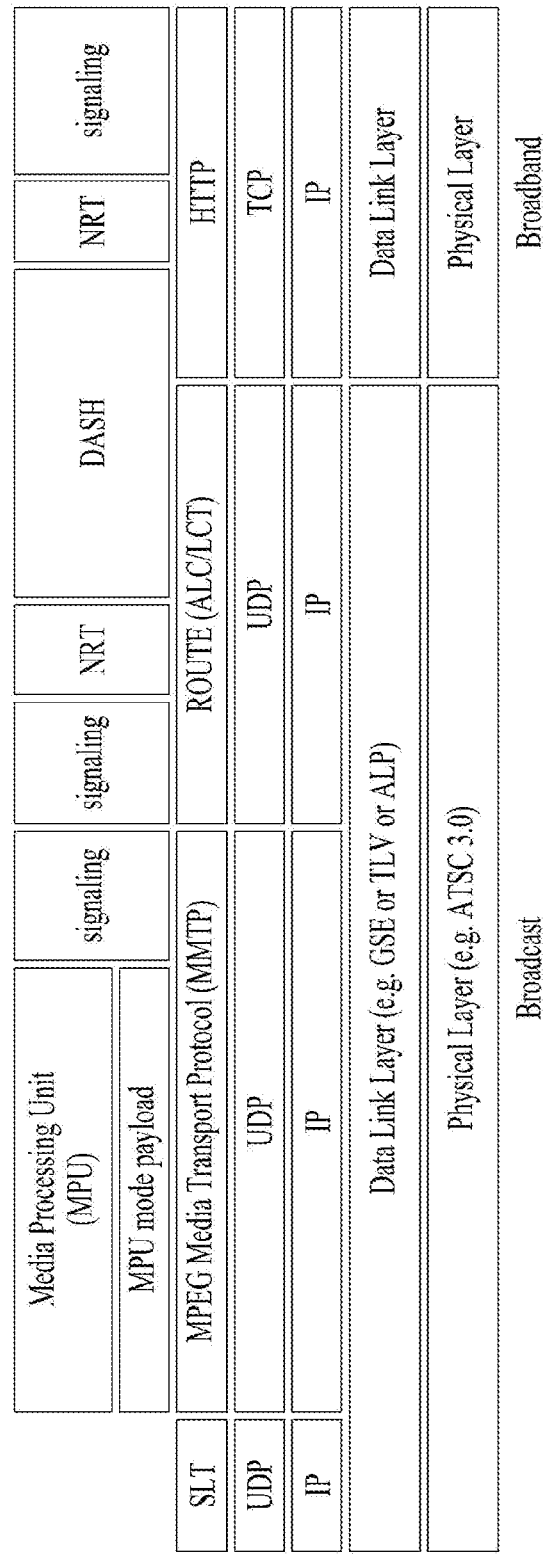
FIG. 1 is a diagram illustrating a protocol stack according to an embodiment of the present disclosure.

FIG. 1 is a diagram illustrating a protocol stack according to an embodiment of the present disclosure.

A service may be delivered to a receiver through a plurality of layers. A transmitting side may first generate service data. In the transmitting side, a delivery layer may process the service data, for transmission, and a physical layer may encode the processed service data into a broadcast signal and transmit the broadcast signal over broadcast or broadband.

The service data may be formatted based on the ISO base media file format (ISO BMFF). An ISO BMFF media file may be used as a delivery, media encapsulation, and/or synchronization format for both broadband and broadcast delivery. Service data refers to all data related to a service, which may include, in concept, service components of a linear service, signaling information for the service components, non-real time (NRT) data, and other files.

The delivery layer will be described. The delivery layer may provide service data transport functionality. Service data may be delivered over broadcast and/or broadband.

There may be two methods of broadcast service delivery.

One of the methods may be to process service data into media processing units (MPUs) based on MPEG media transport (MMT), and transmit the MPUs by the MMT protocol (MMTP). In this case, the service data delivered by the MMTP may include service components of a linear service and/or service signaling information for the service components.

The other method may be to process service data into dynamic adaptive streaming over HTTP (DASH) segments, and transmit the DASH segments by real time object delivery over unidirectional transport (ROUTE). In this case, service data delivered by the ROUTE protocol may include service components of a linear service, service signaling information for the service components, and/or NRT data. That is, non-timed data such as NRT data and files may be delivered via ROUTE.

Data processed in conformance to the MMTP or the ROUTE protocol may be processed into Internet protocol (IP) packets through a user datagram protocol (UDP)/IP layer. In broadcast service delivery, a service list table (SLT) may also be delivered over broadcast through the UDP/IP layer. The SLT may be delivered in a low level signaling (LLS) table. The SLT and the LLS table will be described later.

IP packets may be processed into link layer packets in a link layer. The link layer may encapsulate various formats of data delivered from a higher layer into link layer packets, and then deliver the packets to a physical layer. The link layer will be described later.

In hybrid service delivery, at least one service element may be delivered via the broadband path. In hybrid service delivery, the data delivered over broadband may include service components in a DASH format, service signaling information for the service components, and/or NRT data. These data may be processed through HTTP/TCP/IP and delivered to the physical layer for broadband transmission through the link layer for broadband transmission.

The physical layer may process the data received from the delivery layer (higher layer and/or link layer) and transmit the data over broadcast or broadband. Details of the physical layer will be described later.

A service will be described. A service may be a collection of service components presented to a user in aggregate. The components may be of multiple media types. The service may be either continuous or intermittent. The service may be real time or non-real time, and a real-time service may include a sequence of TV programs.

The service may be of multiple types. First, the service may be a linear audio/video or audio service having app-based enhancement. Secondly, the service may be an app-based service, the reproduction/configuration of which is controlled by a downloaded application. Thirdly, the service may be an electronic service guide (ESG) service that provides an ESG. Fourthly, the service may be an emergency alert (EA) service that provides EA information.

For broadcast deliver of a linear service without app-based enhancement, service components may be delivered by (1) one or more ROUTE sessions, or (2) one or more MMTP sessions.

For broadcast delivery of a linear service with app-based enhancement, service components may be delivered by (1) one or more ROUTE sessions, or (2) zero or more MMTP sessions. In this case, data used for app-based enhancement may be delivered in the form of NRT data or other files via the ROUTE sessions. In an embodiment of the present disclosure, simultaneous use of two protocols for linear service components (streaming media components) in the same service may not be allowed.

For broadcast delivery of an app-based service, service components may be delivered by one or more ROUTE sessions. In this case, service data used for the app-based service may be delivered in the form of NRT data or other files via the ROUTE sessions.

Some service components, some NRT data, files, and so on of such a service may be delivered over broadband (hybrid service delivery).

That is, in an embodiment of the present disclosure, linear service components of one service may be delivered by the MMT protocol. In another embodiment of the present disclosure, linear service components of one service may be delivered by the ROUTE protocol. In another embodiment of the present disclosure, linear service components and NRT data (NRT service components) of one service may be delivered by the ROUTE protocol. In another embodiment of the present disclosure, linear service components of one service may be delivered by the MMT protocol, while NRT data (NRT service components) may be delivered by the ROUTE protocol. In the foregoing embodiments, some service components or some NRT data of the service may be delivered over broadband. Data for the app-based service and the app-based enhancement may be delivered in the form of NRT data over broadcast via the ROUTE protocol or over broadband. NRT data may also be referred to as locally-cached data.

Each ROUTE session includes one or more LCT sessions which carry all or a part of the content components making up the service. In streaming service delivery, an LCT session may carry an individual component of a user service such as an audio, video or closed caption stream. Streaming media is formatted as DASH segments.

Each MMTP session includes one or more MMTP packet flows which carry MMT signaling messages or all or a part of the content components. An MMTP packet flow may carry MMT signaling messages or components formatted into as MPUs.

For delivery of an NRT user service or system metadata, an LCT session carries file-based content items. These content files may include continuous (time-based) or discrete (non-time-based) media components of the NRT service, or metadata such as service signaling or ESG fragments. Delivery of system metadata such as service signaling or ESG fragments may also be achieved through a signaling message mode of the MMTP.

A receiver may detect a broadcast signal in a specific frequency, while a tuner tunes to frequencies. The receiver may extract an SLT, and transmit the SLT to a processing module. An SLT parser may parse the SLT, acquire data, and store the data in a channel map. The receiver may acquire bootstrap information of the SLT, and deliver the bootstrap information to a ROUTE or MMT client. The receiver may acquire service layer signaling (SLS) from the bootstrap information, and store the SLS. A user service bundle description (USBD) and so on may be acquired and parsed by a signaling parser.

Figure 2:
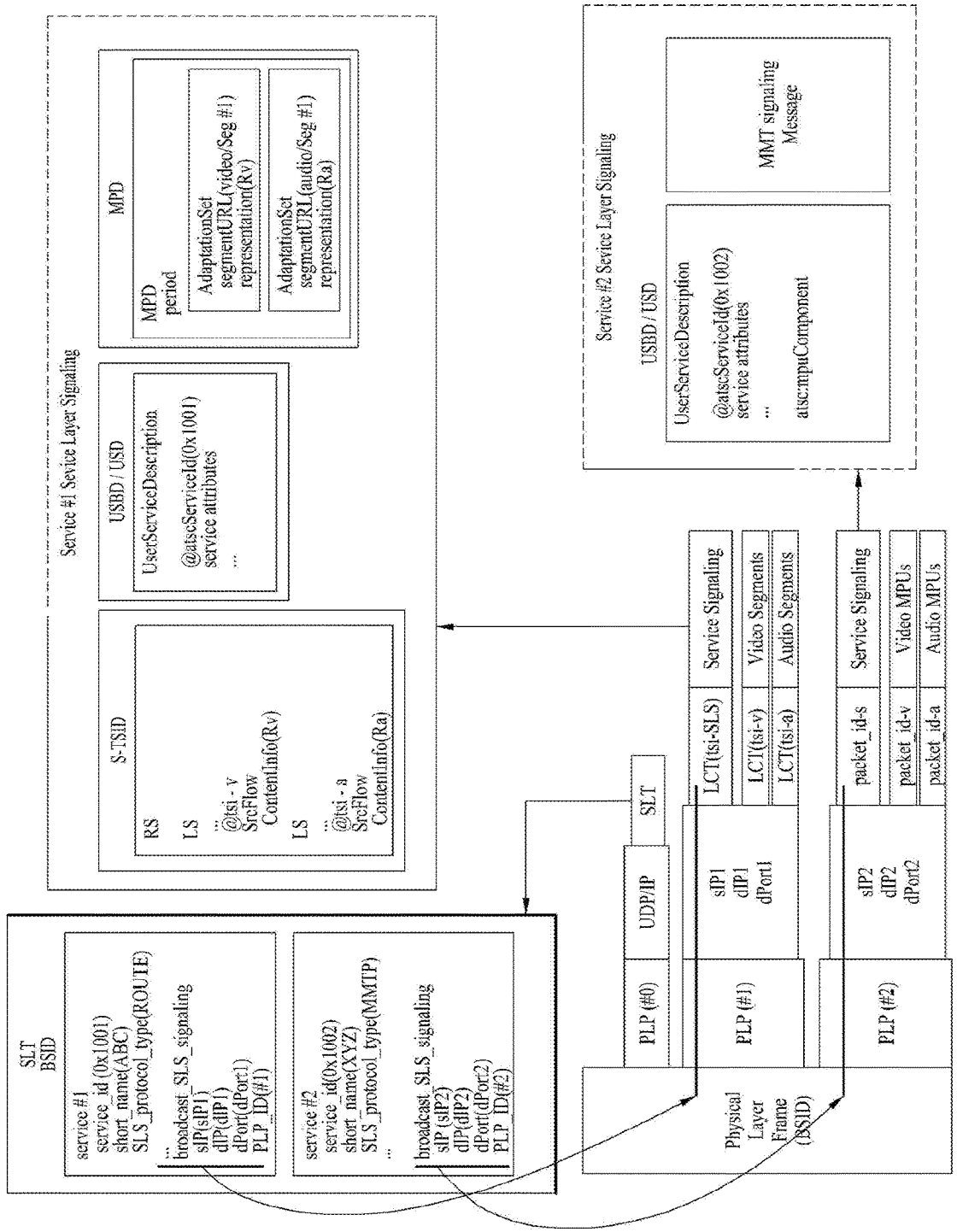
FIG. 2 is a diagram illustrating a service discovery procedure according to an embodiment of the present disclosure.

FIG. 2 is a diagram illustrating a service discovery procedure according to an embodiment of the present disclosure.

A broadcast stream delivered in a broadcast signal frame of the physical layer may carry low level signaling (LLS). LLS data may be carried in the payload of an IP packet delivered to a well-known IP address/port. The LLS may include an SLT according to its type. The LLS data may be formatted in the form of an LLS table. The first byte of every UDP/IP packet carrying LLS data may be the start of an LLS table. Unlike the illustrated embodiment, an IP stream that delivers the LLS data may be delivered along with other service data in the same PLP.

The SLT enables the receiver to build a list of services by rapid channel scan, and provides access information to locate service layer signaling (SLS). The SLT includes bootstrap information. The bootstrap information enables the receiver to discover the SLS for each service. When the SLS, that is, service signaling information is delivered over ROUTE, the bootstrap information may include information about the destination IP address and destination port of an LCT channel carrying the SLS or a ROUTE session including the LCT channel. When the SLS is delivered over MMT, the bootstrap information may include information about the destination IP address and destination port of an MMTP session carrying the SLS.

In the illustrated embodiment, the SLS of service #1 described in the SLT may be delivered via ROUTE, and the SLT may include bootstrap information sIP1, dIP1, and dPort1 about a ROUTE session including an LCT channel carrying the SLS. The SLS of service #2 described in the SLT may be delivered via MMT, and the SLT may include bootstrap information sIP2, dIP2, and dPort2 about an MMTP session including an MMTP packet flow carrying the SLS.

The SLS is signaling information describing characteristics of the service, and may provide information for acquiring the service and service components of the service, and include receiver capability information required to make a meaningful presentation of the service. If SLS is defined on a per-service level, the receiver has only to acquire appropriate SLS for a desired service without parsing whole SLS delivered in a broadcast stream.

When the SLS is delivered by the ROUTE protocol, the SLS may be delivered on a dedicated LCT channel of a ROUTE session indicated by the SLT. In some embodiments, this LCT channel may be identified by tsi=0. In this case, the SLS may include a user service bundle description (USBD)/user service description (USD), a service-based transport session instance description (S-TSID), and/or a media presentation description (MPD).

The USBD/USD is one of SLS fragments, and may serve as a signaling hub describing detailed description information of a service. The USBD may include service identification information, device capability information, and so on. The USBD may include reference information (URI references) of other SLS fragments (S-TSID, MPD, etc.). That is, the USBD/USD may reference the S-TSID and the MPD. In addition, the USBD may further include metadata information that enables the receiver to determine a transport mode (broadcast/broadband). A detailed description of the USBD/USD will be given below.

The S-TSID, which is one of SLS fragments, may provide overall session description information for a transport session carrying service components of the service. The S-TSID may provide transport session description information for a ROUTE session carrying service components of the service and/or an LCT channel of the ROUTE session. The S-TSID may provide component acquisition information for service components associated with one service. The S-TSID may provide mapping between DASH representations found in the MPD and the tsi of the service component. R=The S-TSID may provide the component acquisition information in the form of a tsi and the identifier of the associated DASH representation, and may or may not include a PLP ID in some embodiments. The receiver may collect audio/video components of one service from the component acquisition information, and buffer and decode DASH media segments. The S-TSID may be referenced by the USBD as described above. A detailed description of the S-TSID will be given later.

The MPD, which is one of SLS fragments, may provide a description of the DASH media presentation of the service. The MPD may provide resource identifiers for media segments and provide context information about the identified resources within the DASH media presentation. The MPD may describe a DASH representation (service component) delivered over broadcast, and also an additional DASH representation delivered over broadband (hybrid delivery). The MPD may be referenced by the USBD as described above.

If the SLS is delivered by the MMT protocol, the SLS may be delivered over a dedicated MMTP packet flow of an MMTP session indicated by the SLT. In some embodiments, packet_id of MMTP packets delivering the SLS may have a value of 00. In this case, the SLS may include a USBD/USD and/or MMT package (MP) table.

The USBD, which is one of SLS fragments, may describe detailed description information of a service, as is done in ROUTE. This USBD may also include information about references (URI references) to other SLS fragments. The USBD of the MMT may reference an MP table for MMT signaling. In some embodiments, the USBD of the MMT may also include information about reference to the S-TSID and/or the MPD. Here, the S-TSID may be for NRT data delivered by the ROUTE protocol. This is because even when linear service components are delivered by the MMT protocol, NRT data may be delivered by the ROUTE protocol. In hybrid service delivery, the MPD may be for service components delivered over broadband. A detailed description of the USBD of the MMT will be given later.

The MP table, which is an MMT signaling message for MPU components, may provide overall session description information for an MMTP session carrying service components of the service. In addition, the MP table may include a description of assets delivered in the MMTP session. The MP table is streaming signaling information for MPU components, and may provide a list of assets corresponding to one service and location information (component acquisition information) about these components. Specific contents of the MP table may be defined in the MMT or modified. An asset is a multimedia data entity which is associated with a unique ID, and is used to build a multimedia presentation. The asset may correspond to a constituent service component of one service. A streaming service component (MPU) corresponding to a desired service may be accessed using the MP table. The MP table may be referenced by the USBD as described above.

Other MMT signaling messages may be defined. Additional information related to an MMTP session and a service may be described by such MMT signaling messages.

A ROUTE session is identified by a source IP address, a destination IP address, and a destination port number. An LCT session is identified by a unique transport session identifier (TSI) within the scope of a parent ROUTE session. An MMTP session is identified by a destination IP address and a destination port number. An MMTP packet flow is identified by a unique packet_id within the scope of a parent MMTP session.

In ROUTE, an S-TSID, a USBD/USD, an MPD or an LCT session delivering them may be referred to as a service signaling channel. In MMTP, a USBD/UD, MMT signaling messages, or a packet flow delivering them may be referred to as a service signaling channel.

Unlike the illustrated embodiment, one ROUTE or MMTP session may be delivered in a plurality of PLPs. That is, one service may be delivered in one or more PLPs. Unlike the illustrated embodiment, in some embodiments, components constituting one service may be delivered via different ROUTE sessions. In addition, in some embodiments, components constituting one service may be delivered via different MMTP sessions. In some embodiments, components constituting one service may be delivered separately in a ROUTE session and an MMTP session. While not shown, components constituting one service may be delivered over broadband (hybrid delivery).

FIG. 3 is a diagram illustrating an LLS table and an SLT according to an embodiment of the present disclosure.

An embodiment t3010 of the illustrated LLS table may include information based on an LLS_table_id field, a provider_id field, an LLS_table_version field, and/or an LLS_table_id field.

The LLS_table_id field may identify the type of the LLS table, and the provider_id field may identify a service provider associated with services signaled by the LLS table. The service provider is a broadcaster using all or a part of corresponding broadcast streams, and the provider_id field may identify one of a plurality of broadcasters which are using the broadcast streams. The LLS_table_version field may provide information about the version of the LLS table.

According to the value of the LLS_table_id field, the LLS table may include one of the above-described SLT, a rating region table (RRT) including information about a content advisory rating, SystemTime information that provides information related to a system time, a common alert protocol (CAP) message that provides information related to emergency alert. In some embodiments, other information may be included in the LLS table.

An embodiment t3020 of the illustrated SLT may include an @bsid attribute, an @sltCapabilities attribute, an sltInetUrl element, and/or a Service element. Each field may be omitted or a plurality of fields may be present, according to the value of the illustrated column, Use.

The @bsid attribute may be the identifier of a broadcast stream. The @sltCapabilities attribute may provide capability information required for decoding and meaningfully presenting all services described in the SLT. The sltInetUrl element may provide base URL information used to acquire an ESG and service signaling information for the services of the SLT via broadband. The sltInetUrl element may further include an @urlType attribute which may indicate the type of data available with the URL.

The Service element may include information about the services described in the SLT, and the Service element may exist for each service. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @SvcCapabilities attribute, a BroadcastSvcSignaling element and/or an svcInetUrl element.

The @serviceId attribute is the identifier of the service, and the @sltSvcSeqNum attribute may indicate the sequence number of the SLT information of the service. The @protected attribute may indicate whether at least one service component required for meaningful presentation of the service is protected. The @majorChannelNo attribute and the @minorChannelNo attribute may indicate the major channel number and minor channel number of the service, respectively.

The @serviceCategory attribute may indicate the category of the service. The category of the service may be any of linear A/V service, linear audio service, app-based service, ESG service, EAS service, and so on. The @shortServiceName attribute may provide a short name of the service. The @hidden attribute may indicate whether the service is intended for testing or proprietary use. The @broadbandAccessRequired attribute may indicate whether broadband access is required for meaningful presentation of the service. The @svcCapabilities attribute may provide capability information required for decoding and meaningfully presenting the service.

The BroadcastSvcSignaling element may provide information related to broadcast signaling of the service. This element may provide information such as location, protocol, and address, for broadcasting signaling of the service, which will be described below in detail.

The svcInetUrl element may provide URL information for accessing signaling information for the service via broadband. The sltInetUrl element may further include an @urlType attribute which may indicate the types of data available with the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute, and/or an @slsSourceIpAddress attribute.

The @slsProtocol attribute may indicate the type (ROUTE, MMT, etc.) of a delivery protocol for SLS used by the service. The @slsMajorProtocolVersion attribute and the @slsMinorProtocolVersion attribute may indicate the major version number and minor version number of the protocol used to deliver the SLS for the service, respectively.

The @slsPlpId attribute may provide a PLP identifier that identifies a PLP carrying the SLS of the service. In some embodiments, this field may be omitted, and information about the PLP carrying the SLS may be checked by using information in a later-described LMT and bootstrap information in the SLT in combination.

The @slsDestinationIpAddress attribute, the @slsDestinationUdpPort attribute, and the @slsSourceIpAddress attribute may indicate the destination IP address, destination UDP port, and source IP address of transport packets delivering the SLS of the service, respectively. These attributes may identify a transport session (ROUTE session or MMTP session) delivering the SLS. These attributes may be included in the bootstrap information.

FIG. 4 is a diagram illustrating a USBD and an S-TSID delivered over ROUTE according to an embodiment of the present disclosure.

An embodiment t4010 of the illustrated USBD may have a bundleDescription root element. The bundleDescription root element may have a userServiceDescription element. The userServiceDescription element may be an instance of a service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element, and/or a deliveryMethod element. Each field may be omitted or a plurality of fields may be present, according to the value of the illustrated column, Use.

The @globalServiceID attribute is a globally unique identifier of the service, and may provide linkage to ESG data (Service@globalServiceID). The @serviceId attribute is a reference corresponding to the service entry of the SLT, and may be identical to service ID information of the SLT. The @serviceStatus attribute may indicate the status of the service. This field may specify the status of the service as active or inactive.

The @fullMPDUri attribute may reference to an MPD fragment of the service. The MPD may provide a presentation description of a service component delivered over broadcast network or broadband, as described before. The @sTSIDUri attribute may reference to an S-TSID fragment of the service. The S-TSID may provide access-related parameters to a transport session carrying the service, as described above.

The name element may provide the name of the service. This element may further include an @lang attribute indicating the language of the name provided by the name element. The serviceLanguage element may indicate available languages of the service. That is, this element may arrange the languages in which the service may be provided.

The capabilityCode element may indicate capability or capability group information for a receiver, required to meaningfully present the service. This information is compatible with a capability information format provided in a service announcement.

The deliveryMethod element may provide transport-related information pertaining to the content of the service accessed over broadcast or broadband. The deliveryMethod element may include a broadcastAppService element and/or a unicastAppService element. Each of these elements may have a basePattern element as a child element.

The broadcastAppService element may include transport-related information for DASH representations delivered over broadcast. The DASH representations may include media components over the total period of the service media presentation.

The basePattern element of this element may indicate a character pattern for use by the receiver to match against a segment URL which is used for a DASH client to request media segments of the representation. Match may imply delivery of the media segments over broadcast.

The unicastAppService element may include transport-related information for DASH representations delivered over broadband. The DASH representations may include media components over the total period of the service media presentation.

The basePattern element of this element may indicate a character pattern for use by the receiver to match against the segment URL which may be used for a DASH client to request media segments of the representation. Match may imply delivery of the media segments over broadband.

An embodiment t4020 of the illustrated S-TSID may have an S-TSID root element. The S-TSID root element may include an @serviceId attribute and/or an RS element. Each field may be omitted or a plurality of fields may be present, according to the value of the illustrated column Use.

The @serviceId attribute is the identifier of the service, and may reference to the service of the USBD/USD. The RS element may describe information about ROUTE sessions in which the service components of the service are carried. According to the number of ROUTE sessions, a plurality of RS elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including a PLP delivering the SLS of the service. The value of this field may be equal to that of the @bsid attribute of the SLT.

The @sIpAddr attribute, the @dIpAddr attribute, and the @dport attribute may indicate the source IP address, destination IP address, and destination UDP port of the ROUTE session, respectively. When these fields are omitted, default values may be the source address, destination IP address, and destination UDP port values of a current ROUTE session delivering the SLS, that is, the S-TSID. These fields may not be omitted for any ROUTE session delivering the service components of the service, other than the current ROUTE session.

The @PLPID attribute may indicate PLP ID information about the ROUTE session. If this field is omitted, a default value may be the PLP ID value of a current PLP delivering the S-TSID. In some embodiments, this field is omitted, and the PLP ID information about the ROUTE session may be checked by using information of a later-described LMT and the IP address/UDP port information of the RS element in combination.

The LS element may describe information about LCT channels through which the service components of the service are delivered. According to the number of LCT channels, a plurality of LS elements may be present. The LS element may include an @tsi attribute, an @PLPID attribute, an @bw attribute, an @startTime attribute, an @endTime attribute, a SrcFlow element, and/or a RepairFlow element.

The @tsi attribute may represent the value of transport session identifier (TSI) for the LCT channel. The LCT channel through which the service components of the service are delivered may be identified by the @tsi attribute. The @PLPID attribute may indicate PLP ID information for the LCT channel. In some embodiments, this field may be omitted. The @bw attribute may indicate the maximum bandwidth of the LCT channel. The @startTime attribute may indicate the start time of the LCT channel, and the @endTime attribute may indicate the end time of the LCT channel.

The SrcFlow element may describe a ROURTE source flow. A ROUTE source protocol is used to transmit a delivery object, and may establish at least one source flow within one ROUTE session. The source flow may deliver related objects as an object flow.

The RepairFlow element may describe a ROUTE repair flow. Delivery objects delivered according to the source protocol may be protected according to forward error correction (FEC), and the repair protocol may define an FEC framework enabling the FEC protection.

FIG. 5 is a diagram illustrating a USBD delivered over MMT according to an embodiment of the present disclosure.

An embodiment of the illustrated USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element, and/or a ComponentInfo element. Each field may be omitted or a plurality of fields may be present, according to the value of the illustrated column, Use.

The @globalServiceID attribute, the @serviceId attribute, the Name element, and/or the serviceLanguage element may be identical to corresponding fields of the USBD delivered over ROUTE. The contentAdvisoryRating element may represent the content advisory rating of the service. This information is compatible with a content advisory rating information format provided in a service announcement. The Channel element may include information related to the service. A detailed description of this element will be given later.

The mpuComponent element may provide a description of service components delivered as MPUs of the service. This element may further include an @mmtPackageId attribute and/or an @nextMmtPackageId attribute. The @mmtPackageId attribute may reference to an MMT package of the service components delivered as the MPUs of the service. The @nextMmtPackageId attribute may reference to an MMT package to be used after the MMT package referenced by the @mmtPackageId attribute in time. The MP table may be referenced through information of this element.

The routeComponent element may include a description of the service components of the service, delivered by ROUTE. Even when linear service components are delivered by the MMT protocol, NRT data may be delivered according to the ROUTE protocol, as described before. The routeComponent element may describe information about such NRT data. A detailed description of the routeComponent element will be given below.

The broadbandComponent element may include a description of the service components of the service, delivered over broadband. In hybrid service delivery, some service components of one service or other files may be delivered over broadband. The broadbandComponent element may describe information about such data. The broadbandComponent element may further include an @fullMPDUri attribute. This attribute may reference to an MPD describing the service components delivered over broadband. In addition to hybrid service delivery, when the broadcast signal is weakened due to driving through a tunnel, this element may be required to support handoff between broadcast and broadband. When the broadcast signal is weak, the service components are acquired over broadband, and when the broadcast signal becomes strong again, the service components are acquired over broadcast, thereby ensuring service continuity.

The ComponentInfo element may include information about the service components of the service. According to the number of the service components of the service, a plurality of ComponentInfo elements may be present. The ComponentInfo element may describe the type, role, name, identifier, or protection of each service component. Details of the ComponentInfo element will be described later.

The afore-described Channel element may further include an @serviceGenre attribute, an @serviceIcon attribute, and/or a ServiceDescription element. The @serviceGenre attribute may indicate the genre category of the service, and the @serviceIcon attribute may indicate a URL for an icon used to represent the service. The ServiceDescription element may provide a service description of the service, and further include an @serviceDescrText attribute and/or an @serviceDescrLang attribute. These attributes may indicate the text of the service description and the language used in the text, respectively.

The afore-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute, and/or an @sTSIDMinorProtocolVersion attribute.

The @sTSIDUri attribute may reference to an S-TSID fragment. This field may be identical to a corresponding field of the USBD delivered via ROUTE. The S-TSID may provide access-related information about the service components delivered via ROUTE. The S-TSID may be present for NRT data delivered according to the ROUTE protocol in a situation in which linear service components are delivered by the MMT protocol.

The @sTSIDDestinationIpAddress attribute, the @sTSIDDestinationUdpPort attribute, and the @sTSIDSourceIpAddress attribute may indicate the destination IP address, destination UDP port, and source IP address of transport packets carrying the above-described S-TSID, respectively. That is, these fields may identify a transport session (MMTP session or ROUTE session) carrying the above-described S-TSID.

The @sTSIDMajorProtocolVersion attribute and the @sTSIDMinorProtocolVersion attribute may indicate the major version number and minor version number of a transport protocol used to deliver the S-TSID, respectively.

The afore-described ComponentInfo element may further include an @componentType attribute, an @componentRole attribute, an @componentProtectedFlag attribute, an @componentId attribute, and/or an @componentName attribute.

The @componentType attribute may indicate the type of the component. For example, the @componentType attribute may indicate whether the component is an audio, video or closed caption component. The @componentRole attribute may indicate the role of the component. For example, if the component is an audio component, the @componentRole attribute may indicate whether the role is main audio, music, commentary, or the like. If the component is a video component, the @componentRole attribute may indicate whether the role is primary video. If the component is a closed caption component, the @componentRole attribute may indicate whether the role is a normal caption or an easy reader type.

The @componentProtectedFlag attribute may indicate whether the service component is protected, for example, encrypted. The @componentId attribute may indicate the identifier of the service component. The value of the @componentId attribute may be equal to that of the asset id (asset ID) of the MP table corresponding to this service component. The @componentName attribute may indicate the name of the service component.

FIG. 6 is a diagram illustrating a link layer operation according to an embodiment of the present disclosure.

The link layer may be the layer between the physical layer and the network layer. The link layer may transmit data from the network layer to the physical layer at a transmitting side, and transmit data from the physical layer to the network layer at a receiving side (t6010). The purpose of the link layer may be to abstract all input packet types into a single format for processing by the physical layer, ensuring flexibility and future extensibility for as-yet-undefined input packet types. In addition, the link layer may ensure transmission of input data in an efficient manner by providing options to compress redundant information in the headers of input packets. Operation of the link layer including overhead reduction, encapsulation, and so on are referred to as a link layer protocol, and packets generated by this protocol may be referred to as link layer packets. The link layer may execute functions such as packet encapsulation, overhead reduction, and/or signaling transmission.

At the transmitting, the link layer (ALP) may perform an overhead reduction procedure on input packets, and then encapsulate the input packets into link layer packets. In addition, in some embodiments, the link layer may encapsulate input packets into link layer packets without performing the overhead reduction procedure. The use of the link layer protocol may lead to significant reduction of data transmission overhead in the physical layer, and the link layer protocol according to the present disclosure may provide IP overhead reduction and/or MPEG-2 TS overhead reduction.

When the illustrated IP packets are input as input packets (t6010), the link layer may sequentially perform IP header compression, adaptation, and/or encapsulation. In some embodiments, some processes may be omitted. First, an RoHC module may perform IP packet header compression to thereby reduce unnecessary overhead. Context information may be extracted in the adaptation procedure, and transmitted out of band. The IP header compression and adaption procedures may be collectively referred to as IP header compression. Thereafter, the IP packets may be encapsulated into link layer packets in the encapsulation procedure.

When MPEG 2 TS packets are input as input packets, the link layer may sequentially perform the overhead reduction procedure and/or the encapsulation procedure on the TS packets. In some embodiments, some procedure may be omitted. In overhead reduction, the link layer may provide sync byte removal, null packet deletion, and/or common header removal (compression). The sync byte removal may provide an overhead reduction of one byte per TS packet. Null packet deletion may be performed in a manner that allows null packet reinsertion at the receiving side. In addition, information common to consecutive headers may be deleted (compressed) in a manner that allows recovery of the information at the receiving side. A part of each overhead reduction procedure may be omitted. Thereafter, the TS packets may be encapsulated into link layer packets in the encapsulation procedure. The structure of a link layer packet in which a TS packet is encapsulated may be different from those of other types of packets.

First, IP header compression will be described.

Although an IP packet has a fixed header format, some information required for a communication environment may be redundant in a broadcast environment. The link layer protocol may provide a mechanism for reducing broadcast overhead by compressing the header of the IP packet.

IP header compression may involve a header compressor/decompressor and/or an adaptation module. The IP header compressor (RoHC compressor) may reduce the size of the header of each IP packet based on a RoHC scheme. Subsequently, the adaptation module may extract context information, and generate signaling information from each packet stream. A receiver may parse the signaling information related to the packet stream, and attach the context information to the packet stream. The RoHC decompressor may reconstruct the original IP packet by recovering the packet header. Hereinbelow, IP header compression may refer only to IP header compression of a header compressor, or refer to both of IP header compression and adaptation of an adaptation module, in concept. The same thing applies to decompression.

Now, adaptation will be described.

In the case of transmission via a unidirectional link, if the receiver has no context information, the decompressor may not recover the received packet header until receiving full context data, thereby causing channel change delay and turn on delay. For this reason, configuration parameters and context information between the compressor and the decompressor may be transmitted out of band by the adaptation function. The adaptation function may construct link layer signaling by using the context information and/or the configuration parameters. The adaptation function may periodically transmit link layer signaling in each physical frame by using the previous configuration parameters and/or context information.

Context information is extracted from compressed IP packets, and various methods may be used according to adaptation modes.

In Mode #1, no operation is performed on a compressed packet stream, and the adaptation module may operate as a buffer.

In Mode #2, an IR packet may be detected from a compressed packet stream, and context information (static chain) is extracted. After the extraction, the IR packet may be converted into an IR-DYN packet. The converted IR-DYN packet may be transmitted in the packet stream in the same order as the IR packet, replacing the original packet.

In Mode #3 (t6020), IR and IR-DYN packets are detected from a compressed packet stream, and context information is extracted. A static chain and a dynamic chain may be extracted from the IR packet, and a dynamic chain may be extracted from the IR-DYN packet. After the extraction, the IR and IR-DYN packets may be converted into general compressed packets. The converted packets may be transmitted in the packet stream in the same order as the IR and IR-DYN packets, replacing the original packets.

In each mode, after context information is extracted, the remaining packets may be encapsulated and transmitted according to a link layer packet structure for compressed IP packets. The context information may be encapsulated and transmitted as link layer signaling according to a link layer packet structure for signaling information.

The extracted context information may be included in a RoHC-U description table (RDT), and transmitted separately from a RoHC packet flow. The context information may be transmitted along with other signaling information through a specific physical data path. In some embodiments, the specific physical data path may be one of a general PLP, a PLP carrying LLS, a dedicated PLP, or an L1 signaling path. The RDT may be signaling information including context information (static chain and/or dynamic chain) and/or information related to header compression. In some embodiments, each time the context information is changed, the RDT may be transmitted. Further, in some embodiments, the RDT may be transmitted in each physical frame. To transmit an RDT in each physical frame, a previous RDT may be reused.

Before acquiring a packet stream, the receiver may acquire signaling information including an SLT, an RDT, an LMT, and so on by selecting an initial PLP. When the receiver acquires the signaling information, the receiver may acquire mappings among services, IP information, context information, and PLPs by combining the signaling information. That is, the receiver may determine which service is transmitted in which IP streams, and which PLP delivers which IP streams, and may also acquire context information about PLPs. The receiver may select a PLP carrying a specific packet stream, and decode the PLP. The adaptation module may parse the context information, and combine the context information with compressed packets. In this manner, the packet stream may be recovered, and delivered to the RoHC decompressor. Decompression may then start. According to an adaptation mode, the receiver may detect IR packets, and start decompression with a first received IR packet (Mode #1), detect IR-DYN packets and start decompression with a first received IR-DYN packet (Mode #2), and start decompression with any general compressed packet (Mode #3).

Packet encapsulation will be described below.

The link layer protocol may allow encapsulation of any type of input packet, including IP packets, TS packets, and so on into link layer packets. Thus, the physical layer has only to process only one packet format, independent of a network layer protocol type (herein, an MPEG-2 TS packet is considered as a kind of network layer packet). Each network layer packet or input packet is converted into the payload of a generic link layer packet.

In the packet encapsulation procedure, segmentation may be used. If a network layer packet is too large to be processed in the physical layer, the network layer packet may be divided into two or more segments. The link layer packet header may include fields for segmentation at the transmitting side and reassembly at the receiving side. Each segment may be encapsulated into a link layer packet in the same order as its original position.

In the packet encapsulation procedure, concatenation may also be used. If a network layer packet is so small that the payload of a link layer packet includes several network layer packets, concatenation may be performed. The header of the link layer packet may include fields for concatenation. In concatenation, each input packet may be encapsulated(concatenated?) into the payload of a link layer packet in the same order as the original input order.

The link layer packet may include a header and payload. The header may include a base header, an additional header, and/or an optional header. The additional header may be added according to a situation such as concatenation or segmentation, and may include fields suitable for the situation. In addition, the optional header may further be included to deliver additional information. Each header structure may be predefined. As described before, if input packets are TS packets, a link layer header structure different from that of other packets may be used.

Link layer signaling will be described below.

Link layer signaling may operate below the IP layer. The receiving side may obtain link layer signaling earlier than IP level signaling such as LLS, an SLT, SLS, and so on. Accordingly, the link layer signaling may be obtained before session establishment.

Link layer signaling may include internal link layer signaling and external link layer signaling. Internal link layer signaling may be signaling information generated in the link layer. The afore-described RDT or the later-described LMT may be internal link layer signaling. External link layer signaling may be signaling information received from an external module, an external protocol, or a higher layer. The link layer may encapsulate link layer signaling into a link layer packet, and deliver the link layer packet. A link layer packet structure (header structure) for link layer signaling may be defined, and link layer signaling information may be encapsulated according to this structure.

FIG. 7 is a diagram illustrating an LMT according to an embodiment of the present disclosure.

The LMT may provide a list of higher-layer sessions carried in a PLP. The LMT may also provide additional information for processing link layer packets carrying the higher-layer sessions. The higher-layer sessions may be referred to as multicasts. Information about IP streams and transport sessions carried in a specific PLP may be acquired from the LMT. In contrast, information about a PLP carrying a specific transport session may be acquired from the LMT.

An LMT may be delivered in any PLP identified as carrying LLS. The PLP carrying the LLS may be indicated by an LLS flag in L1 detail signaling information of the physical layer. The LLS flag may be a flag field indicating, for each PLP, whether LLS is delivered in the PLP. The L1 detail signaling information may correspond to later-described PLS2 data.

That is, the LMT may be delivered together with the LLS in the same PLP. Each LMT may describe mappings between PLPs and IP addresses/ports, as described before. As described before, the LLS may include an SLT, and an IP address/port described by the LMT may be any IP address/port associated with any service described in an SLT carried in an identified PLP carrying the LMT.

In some embodiments, PLP identifier information may be used in the above-described SLT, SLS, and so on, so that information indicating a PLP carrying a specific transport session indicated by the SLT and SLS may be checked.

In another embodiment, the PLP identifier information may be omitted in the above-described SLT, SLS, and so on, and PLP information about the specific transport session indicated by the SLT and SLS may be checked by referring to information in the LMT. In this case, the receiver may identify an intended PLP by combining the LMT and other IP level signaling information. Even in this embodiment, PLP information may remain in the SLT, SLS, and so on without being omitted.

The LMT according to the illustrated embodiment may include a signaling_type field, a PLP_ID field, a num_session field, and/or information about each session. Although the LMT of the illustrated embodiment describes IP streams transmitted in one PLP, a PLP loop may be added to the LMT to describe information about a plurality of PLPs in some embodiments. In this case, as described before, the LMT may describe PLPs for any IP addresses/ports associated with any service described by the SLT delivered together with the LMT, as a PLP loop.

The signaling_type field may indicate the type of signaling information delivered in the table. For the LMT, the value of the signaling_type field may be set to 0x01. The signaling_type field may be omitted. The PLP_ID field may identify a PLP to be described. If a PLP loop is used, each PLP_ID field may identify a target PLP. The PLP_ID field and the subsequent fields may be included in the PLP loop. The PLP_ID field as mentioned below identifies one PLP in the PLP loop, and the following fields may be intended for the PLP.

The num_session field may indicate the number of higher layer sessions delivered in the PLP identified by the PLP_ID field. According to the number indicated by the num_session field, information about each session may be included. This information may include a src_IP_add field, a dst_IP_add field, a src_UDP_port field, a dst_UDP_port field, an SID_flag field, a compressed_flag field, an SID field, and/or a context_id field.

The src_IP_add field, the dst_IP_add field, the src_UDP_port field, and the dst_UDP_port field may indicate the source IP address, destination IP address, source UDP port, and destination UDP port of a transport session among the higher layer sessions delivered in the PLP identified by the PLP_ID field.

The SID_flag field may indicate whether a link layer packet delivering the transport session has an SID field in its optional header. The link layer packet delivering the higher layer session may have an SID field in the optional header, and the value of the SID field may be equal to that of the SID field in the later-described LMT.

The compressed_flag field may indicate whether header compression is applied to data of the link layer packet delivering the transport session. In addition, the presence or absence of a later-described context_id field may be determined according to the value of this field. If header compression is applied (compressed_flag=1), an RDT may exist, and the PLP ID field of the RDT may have a value equal to that of a PLP_ID field related to this compressed_flag field.

The SID field may indicate the SIDs (sub stream IDs) of link layer packets delivering the transport session. The link layer packets may include SIDs having values equal to that of this SID field in their optional headers. Thus, the receiver may filter the link layer packets, using information of the LMT and information about the SIDs of the link layer packet headers, without the need for parsing all of the link layer packets.

The context_id field may provide a reference for a context id (CID) in the RDT. The CID information of the RDT may indicate the context ID of a corresponding compressed IP packet stream. The RDT may provide context information about the compressed IP packet stream. The RDT and the LMT may be associated by this field.

In the foregoing embodiments of signaling information/tables according to the present disclosure, the fields, elements, or attributes may be omitted or replaced with other fields. In some embodiments, other fields, elements, or attributes may be added.

In an embodiment of the present disclosure, service components of one service may be delivered in a plurality of ROUTE sessions. In this case, SLS may be acquired from bootstrap information in an SLT. An S-TSID and an MPD may be referenced by the USBD of the SLS. The S-TSID may describe not only the ROUTE session delivering the SLS but also transport session description information of another ROUTE session carrying the service components. Thus, the service components delivered in the plurality of ROUTE sessions may all be collected. This is similarly applicable to the case in which the service components of one service are delivered in a plurality of MMTP sessions. For reference, one service component may be simultaneously used by a plurality of services.

In another embodiment of the present disclosure, ESG bootstrapping may be performed over broadcast or broadband. ULR information of an SLT may be used by acquiring an ESG over broadband. ESG information may be requested to this URL.

In another embodiment of the present disclosure, one service component of one service may be delivered over broadcast, and another service component may be delivered over broadband (hybrid). An S-TSID may describe components delivered over broadcast, thereby enabling a ROUTE client to acquire desired service components. In addition, a USBD may have base pattern information, and thus describe which segments (which components) are delivered in which path. Accordingly, the receiver may identify a segment to be requested to a broadband server, and a segment to be detected in a broadcast stream.

In another embodiment of the present disclosure, scalable coding of a service may be performed. The USBD may have all capability information required to render the service. For example, when one service is provided in HD or UHD, the capability information of the USBD may have a value of "HD or UHD". The receiver may determine which component is to be presented in order to render the UHD or HD service by using an MPD.

In another embodiment of the present disclosure, which SLS fragment is delivered in LCT packets (USBD, S-TSID, MPD, etc.) may be identified by the transport object indicator (TOI) fields of the LCT packets delivered in an LCT channel delivering SLS.

In another embodiment of the present disclosure, app components to be used for app-based enhancement/an app-based service may be delivered as NRT components over broadcast, or may be delivered over broadband. In addition, app signaling for app-based enhancement may be performed by an application signaling table (AST) delivered along with the SLS. In addition, an event which is signaling for an operation to be performed by an app may be delivered in the form of an event message table (EMT) along with the SLS, may be signaled in an MPD, or may be in-band signaled in the form of a box within a DASH representation. The AST, the EMT, and so on may be delivered over broadband. App-based enhancement may be provided by using the collected app components and the signaling information.

In another embodiment of the present disclosure, a CAP message may be included and provided in the above-described LLS table, for emergency alert. Rich media content for emergency alert may also be provided. Rich media may be signaled by a CAP message, and if rich media is present, the rich media may be provided as an EAS service signaled by the SLT.

In another embodiment of the present disclosure, linear service components may be delivered over broadcast according to the MMT protocol. In this case, NRT data (e.g., app components) of the service may be delivered over broadcast according to the ROUTE protocol. In addition, data of the service may be delivered over broadband. The receiver may access an MMTP session delivering the SLS by using the bootstrap information of the SLT. The USBD of the SLS based on the MMT may reference to the MP table to enable the receiver to acquire linear service components formatted into MPUs delivered according to the MMT protocol. In addition, the USBD may further reference to the S-TSID such that the receiver acquires NRT data delivered according to the ROUTE protocol. In addition, the USBD may further reference to the MPD to provide a reproduction description of data delivered over broadband.

In another embodiment of the present disclosure, the receiver may deliver location URL information for acquiring a streaming component and/or a file content item (file, etc.) to a companion device in a manner such as through a web socket. An application of a companion device may acquire components, data, and so on by a request to this URL through HTTP GET. In addition, the receiver may deliver information such as system time information, emergency alert information, and so on to the companion device.

FIG. 8 is a diagram illustrating a structure of a broadcast signal transmission apparatus for a next-generation broadcast service according to an embodiment of the present disclosure.

The broadcast signal transmission apparatus for a next-generation broadcast service according to an embodiment of the present disclosure may include an input format block 1000, a bit interleaved coding & modulation (BICM) block 1010, a frame building block 1020, an orthogonal frequency division multiplexing (OFDM) generation block 1030, and a signaling generation block 1040. An operation of each block of the broadcast signal transmission apparatus will be described.

According to an embodiment of the present disclosure, for input data, an IP stream/packet and an MPEG2-TS may be main input formats, and other stream types may be handled as general streams.

The input format block 1000 may demultiplex each input stream into one or more data pipes to which independent codings and modulations are applied. A data pipe is a basic unit for robustness control, and affects quality of service (QoS). One or more services or service components may be delivered in one data pipe. A data pipe is a logical channel in the physical layer, which delivers service data or related metadata, for delivering one or more services or service components.

Since QoS is dependent upon the characteristics of a service provided by the broadcast signal transmission apparatus for a next-generation broadcast service according to an embodiment of the present disclosure, data corresponding to each service needs to be processed in a different manner.

The BICM block 1010 may include a processing block for a profile (or system) to which MIMO is not applied and/or a processing block for a profile (or system) to which MIMO is applied, and may include a plurality of processing blocks for processing the respective data pipes.

The processing block of the BICM block, to which MIMO is not applied, may include a data FEC encoder, a bit interleaver, a constellation mapper, a signal space diversity (SSD) encoding block, and a time interleaver. The processing block of the BICM block, to which MIMO is applied, is different from the processing block of the BICM, to which MIMO is not applied, in that the former further includes a cell word demultiplexer and a MIMO encoding block.

The data FEC encoder may perform FEC encoding on an input BBF, using external coding (BCH) and internal coding (LDPC), to generate a FECBLOCK procedure. The external coding (BCH) is optional. The bit interleaver may interleave the output of the data FEC encoder to achieve optimized performance using a combination of an LDPC code and a modulation scheme. The constellation mapper may modulate a cell word from a bit interleaver or a cell word demultiplexer, in QPSK, QAM-16, irregular QAM (NUQ-64, NUQ-256, or NUQ-1024), or an irregular constellation (NUC-16, NUC-64, NUC-256, or NUC-1024), and provide a power-normalized constellation point. NUQ has an arbitrary shape, whereas QAM-16 and NUQ have a square shape. Both of the NUQ and the NUC may be defined specially for each code rate and signaled by a parameter DP_MOD of PLS2 data. The time interleaver may operate at a data pipe level. A different time interleaving parameter may be configured for each data pipe.

The time interleaver according to the present disclosure may be positioned between a BICM chain block and a frame builder. In this case, the time interleaver according to the present disclosure may use a selected one or both of a convolution interleaver (CI) and a block interleaver (BI) according to a PLP mode. A PLP according to an embodiment of the present disclosure is a physical path used in the same concept as the afore-mentioned DP, and its name may be changed according to a designer's intent. PLP modes according to an embodiment of the present disclosure may include a single PLP mode and a multiple PLP mode according to the number of PLPs processed by the broadcast signal transmitter or the broadcast signal transmission apparatus. Time interleaving performed in different time interleaving schemes according to PLP modes may be referred to as hybrid time interleaving in the present disclosure.

A hybrid time interleaver may include a block interleaver (BI) and a convolution interleaver (CI). If PLP_NUM=1, the BI is not applied (BI off), and only the CI is applied. If PLP_NUM>1, both the BI and the CI may be applied (BI on). Different structures and operations of the CI may be applied when PLP_NUM>1 and when PLP_NUM=1. The hybrid time interleaver may perform an operation corresponding to a reverse operation of the afore-mentioned hybrid time interleaver.

The cell word demultiplexer may be used to divide a single cell word stream into dual cell word streams for MIMO processing. The MIMO encoding block may process the output of the cell word demultiplexer by a MIMO encoding scheme. The MIMO encoding scheme according to the present disclosure may be defined as full-rate spatial multiplexing (FR-SM) for providing a capacity increase with a relatively low increase in complexity at the receiving side. MIMO processing is applied at the data pipe level. When a pair NUQ $e_{1,i}$ and $e_{2,i}$ output from the constellation mapper is input to the MIMO encoder, a pair g1,i and g2,i output from the MIMO encoder may be transmitted in the same carrier k and OFDM symbol 1 of each transmission antenna.

The frame building block 1020 may map the data cells of the input data pipes to an OFDM symbol in one frame, and perform frequency interleaving for frequency diversity.

According to an embodiment of the present disclosure, a frame is divided into a preamble, one or more frame signaling symbols (FSS), and a normal data symbol. The preamble is a special symbol that provides a set of basic transmission parameters for effective transmission and reception of a signal. The preamble may signal the basic transmission parameters and the transmission type of the frame. Particularly, the preamble may indicate whether the emergency alert service (EAS) is provided in a current frame. The main purpose of the FSS is to transmit PLS data. For fast synchronization, channel estimation, and fast decoding of PLS data, the FSS has a pipe pattern with a higher density than the normal data symbol.

The frame building block may include a delay compensation block for adjusting a timing between a data pipe and corresponding PLS data to ensure co-time between the data pipe and the PLS data at the transmitting side, a cell mapper for mapping a PLS, a data pipe, an auxiliary stream, a dummy stream, and so on to an active carrier of an OFDM symbol in a frame, and a frequency interleaver.

The frequency interleaver may randomly interleave the data cells received from the cell mapper to provide frequency diversity. The frequency interleaver may also operate for data corresponding to an OFDM symbol pair including two successive OFDM symbols or data corresponding to one OFDM symbol, using different interleaving seed orders in order to achieve a maximum interleaving gain in a single frame.

The OFDM generation block 1030 may modulate an OFDM carrier by the cells generated from the frame building block, insert a pilot, and generate a time signal for transmission. Further, the OFDM generation block 1030 may sequentially insert guard intervals, and apply peak to average power ratio (PAPR) reduction processing, thereby generating a final RF signal.

The signaling generation block 1040 may generate physical layer signaling information for use in an operation of each functional block. The signaling information according to an embodiment of the present disclosure may include PLS data. The PLS provides means for enabling the receiver to access a physical layer data pipe. The PLS data includes PLS1 data and PLS2 data.

The PLS1 data may be a first set of PLS data delivered in the FSS of a frame having a fixed size, coding, and modulation, which carries basic system information as well as a parameter required to decode the PLS2 data. The PLS1 data provides basic transmission parameters including a parameter required to receive and decode the PLS2 data. The PLS2 data is a second set of PLP data transmitted in the FSS, for transmitting more detailed PLS data of a data pipe and a system. PLS2 signaling may further include two types of parameters: PLS2 static data (PLS2-STAT data) and PLS2 dynamic data (PLS2-DYN data). The PLS2 static data is PLS2 data that is static during the duration of a frame group, while the PLS2 dynamic data is PLS2 data that is dynamically changed in each frame.

The PLS2 data may include FIC_FLAG information. A fast information channel (FIC) is a dedicated channel for transmitting cross-layer information that enables fast service acquisition and channel scan. The FIC_FLAG information is a 1-bit field indicating whether an FIC is used in a current frame group. When the value of the field is set to 1, an FIC is provided in the current frame. When the value of the field is set to 0, an FIC is not transmitted in the current frame. The BICM block 1010 may include a BICM block for protecting PLS data. The BICM block for protecting PLS data may include a PLS FEC encoder, a bit interleaver, and a constellation mapper.

The PLS FEC encoder may include a scrambler for scrambling PLS1 data and PLS2 data, a BCH encoding/zero insertion block for performing external encoding on the scrambled PLS 1 and 2 data by a BCH code shortened for PLS protection, and inserting zero bits after the BCH encoding, an LDPC encoding block for performing encoding by an LDPC code, and an LDPC parity puncturing block. Only for the PLS1 data, zero-inserted output bits may be permutated before the LDPC encoding. The bit interleaver may interleave each of the shortened and punctured PLS1 data and PLS2 data, and the constellation mapper may map the bit-interleaved PLS1 data and PLS2 data to a constellation.

A broadcast signal reception apparatus for a next-generation broadcast service according to an embodiment of the present disclosure may reversely perform the operation of the broadcast signal transmission apparatus for a next-generation broadcast service, which has been described with reference to FIG. 8.

The broadcast signal reception apparatus for a next-generation broadcast service according to an embodiment of the present disclosure may include a synchronization & demodulation module for performing demodulation corresponding to a reverse operation of the procedure performed by the broadcast signal transmission apparatus, a frame parsing module for parsing an input signal frame, and extracting data in which a user-selected service is transmitted, a demapping & decoding module for converting an input signal into bit-domain data, deinterleaving the bit-domain data when needed, performing demapping corresponding to mapping applied for transmission efficiency, and correcting an error that has occurred to a transport channel by decoding, an output processor for performing reverse operations of various compression/signal processing procedures performed by the broadcast signal transmission apparatus, and a signaling decoding module for acquiring PLS information from the signal demodulated by the synchronization & demodulation module, and processing the PLS information. The frame parsing module, the demapping & decoding module, and the output processor may perform the functions, using the PLS data output from the signaling decoding module.

Now, a description will be given of the time interleaver. According to an embodiment of the present disclosure, a time interleaving group may be mapped directly to one frame or spread across $P_I$ frames. Further, each time interleaving group is divided into one or more ($N_{TI}$) time interleaving blocks. Each of the time interleaving blocks corresponds to one use of a time interleaver memory. The time interleaving blocks of the time interleaving group may include different numbers of XFECBLOCKs. In general, the time interleaver may also function as a buffer for data pipe data prior to the frame generation procedure.

According to an embodiment of the present disclosure, the time interleaver may be a twisted row-column block interleaver. The twisted row-column block interleaver according to an embodiment of the present disclosure may write a first XFECBLOCK column-wise in a first column of the time interleaving memory, write a second XFECBLOCK in a next column, and write the remaining XFECBLOCKs of the time interleaving block in the same manner. In the interleaving array, cells may be read out in a diagonal direction from a first row (to the right along the row, starting from a leftmost column) to a last row. In this case, to achieve single memory deinterleaving at the receiving side irrespective of the number of XFECBLOCKs in the time interleaving block, the interleaving array for the twisted row-column block interleaver may insert virtual XFECBLOCKs into the time interleaving memory. In this case, to achieve the single memory deinterleaving at the receiving side, the virtual XFECBLOCKs need to be inserted before other XFECBLOCKs.

A description will be given of methods of transmitting a service in multiple RF channels. That is, methods of transmitting a service in two or more RF channels, and methods of configuring signaling information for the same will be described.

A broadcast service may have components delivered in one or more RF channels. A set of components of such a service within one RF channel may be referred to as a portion of the service. When the set does not include all components of the service, this service set may be referred to as a portion. On the other hand, when a set of components of a service includes all components of the service, and one or more such sets of components are delivered, the set(s) may be referred to as duplicate(s) of the service. Each service represented by portions may include an essential portion which is sufficient for a meaningful provisioning/presentation of the service without the use of the other portions. Each service may include only one essential portion. Portions other than the essential portion may be referred to as non-essential portions. However, the use of the non-essential portions in addition to the potential portion may provide a more appealing presentation of the service.

A portion or duplicate of a service may be delivered on a single RF channel without channel bonding. When channel bonding is applied to an ALP packet stream, a portion or duplicate of a service may be delivered in bonded RF channels. Hereinbelow, signaling methods for transmission schemes with and without channel bonding will be described.

1. When service portions or duplicates are delivered without channel bonding.

(1) Each service represented by either service portions or duplicates is included in SLTs of RF channels in which the portions or duplicates appear. Each of multiple listings of services as represented by its portions or duplicates may have the same value of service ID, and the same value of major/minor channel number. This enables the multiple portions or duplicates of a service carried in multiple RF channels to be consolidated into a single service, when a receiver performs channel scan. An SLT entry for an essential portion or any duplicate of the service may list the broadcast stream identifies (BSIDs) of broadcast streams in which the other portions or duplicates may be found.

(2) An S-TSID may be delivered in a PLP of each RF channel that delivers a service portion or duplicate. The S-TSID for each portion or duplicate of the service may describe ROUTE sessions and LCT channels for each component of the service portion or duplicate.

2. When service portions are delivered with channel bonding, that is, when some service portions are delivered in bonded PLPs of a plurality of RF channels, 2-1: If the essential portion of a service is delivered in a non-bonded channel (PLP) of an RF channel, (1) SLTs associated with both of a non-boded PLP and a bonded PLP that deliver any portions of the service list the service. Each of multiple listings of the service as represented by a portion of the service may have the same value of service ID and the same value of major/minor channel number. Only the SLT entry for the essential portion of the service may list the BSIDs of broadcast streams in which the other portions may be found.

(2)(a) An S-TSID may be delivered in a non-bonded PLP of each RF channel that delivers a service portion. (b) An S-TSID may be delivered in a bonded PLP of bonded RF channels that deliver another service portion.

In (a), each S-TSID instance may describe ROUTE sessions and LCT channels for each component of the service portion delivered by the corresponding non-bonded PLP(s) in the RF channel to which the PLP carrying the S-TSID belongs. In (b), each S-TSID instance may describe ROUTE sessions and LCT channels for each component of the service portion delivered by the corresponding PLP(s) in the bonded RF channels to which the PLP carrying the S-TSID belongs.

2-2. If the essential portion of a service is delivered in bonded PLP(s) of bonded RF channels, (1) Only a single SLT associated with the bonded PLP(s) that deliver the essential portion of the service may list the service. The SLT instance of the service may list the BSIDS of broadcast streams in which the other service portions may be found.

(2) A single S-TSID for the service is delivered in a bonded PLP of the bonded RF channels that deliver the essential portion of the service. The S-TSID instance may describe ROUTE sessions and LCT channels for all the components of the service.

3. When service duplicates are delivered with channel bonding, that is, when service duplicates are delivered in bonded PLP(s) of bonded RF channels.

(1) SLTs associated with both of a non-bonded PLP and a bonded PLP that deliver duplicates of the service may list the service. Each of multiple listings of the service as represented by its duplicates may have the same value of service ID and the same value of major/minor channel number. An SLT entry for a duplicate of the service may list the BSIDS of broadcast streams in which the other duplicates may be found.

(2) (a) S-TSIDs may be delivered in a non-bonded PLP of each RF channel that delivers a service duplicate. (b) Each S-TSID may be delivered in a bonded PLP of bonded RF channels that deliver another service duplicate.

In (a), each S-TSID instance may describe ROUTE sessions and LCT channels for each component of the service duplicate delivered by the corresponding non-bonded PLP(s) in the RF channel to which the PLP carrying the S-TSID belongs. In (b), each S-TSID instance may describe ROUTE sessions and LCT channels for each component of the service duplicate delivered by the corresponding bonded PLP(s) in the bonded RF channels to which the PLP carrying the S-TSID belongs.

Multiple tuners may be required to recover an ALP packet stream from bonded PLPs. For example, the same number of tuners as the number of RF channels for the bonded PLPs may be required. To be able to acquire a service to which channel bonding is applied, a single-tuner receiver should be able to acquire an SLT describing the service. If the S-TSID of the service is acquired with a single tuner tuned to a particular RF channel, then all components listed with the S-TSID may be acquired with a tuner tuned to the same RF channel. That is, with the above-described signaling structure, even a single-tuner receiver may identify all services, and receive and acquire components of a service.

FIG. 9 illustrates SLT information according to an embodiment of the present disclosure.

FIG. 9 depicts another embodiment of the SLT illustrated in FIG. 3, in which the SLT further includes signaling information for the afore-described multi-channel transmission. Therefore, the elements and attributes included in the SLT, described with reference to FIG. 3 will not be described herein to avoid redundancy. The signaling information added to the SLT of FIG. 9 will be described below. All the added signaling information corresponds to subordinate information under the Service element.

@essential: An @essential attribute 9010 in the Service element indicates whether a service portion delivered in this broadcast stream is essential. When a service includes one or more portions delivered on one or more RF channels, the Boolean value of the @essential attribute indicates whether the essential portion of the service is delivered in this broadcast stream. When at least one OtherBsid element with @type set to 2 is present for the service, this Boolean attribute may be present. The default value of the @essential attribute may be set to "false".

OtherBsid: An OtherBsid element 9020 corresponds to identifier information that identifies another broadcast stream delivering a duplicate or portion of this service. The format of an instance of OtherBsid may be identical to the format of an instance of the @bsid attribute in the SLT. When the @essential attribute is not set to "true", this element may not be present.

@type: A @type attribute 9030 indicates whether the broadcast stream identified by the OtherBsid element includes a duplicate or a portion of this service. When the value of @type is set to 1, this may indicate a duplicate of the service, and when the value of @type is set to 2, this may indicate a portion of the service. If the value of @type is set to 2, this may indicate that the Service element represents a portion of the service. This service portion has components in the broadcast stream identified by the identifier OtherBsid, and the service identifier of the service portion is given by the value of the @serviceId attribute of the parent Service element. When one or more OtherBsid elements are present under the parent Service element, the OtherBsid@type attribute values of all these elements may be equal.

When the @type attribute is set to a value corresponding to "duplicate", the @type attribute may indicate that the broadcast stream identified by the OtherBsid element is a duplicate of the service. When the @type attribute is set to a value corresponding to "portion", the @type attribute may indicate that the broadcast stream identified by the OtherBsid element is another portion including an additional component of the service. When the @type attribute is set to the value corresponding to "portion", the @type attribute may indicate that the Service element represents a portion including a component in multiple broadcast streams.

As described before, the S-TSID is an SLS metadata fragment that contains transport session description information for ROUTE sessions and LCT channels within a media content component delivering a broadcast service (ROUTE sessions and LCT channels in which media content components of a broadcast service are delivered). The S-TSID may include file metadata for a delivery object or object flow carried in the LCT channels of the service. The S-TSID may include additional information about payload formats and content components carried in the LCT channels.

Components of a service may be delivered in a single broadcast stream or in multiple broadcast streams with(or without) channel bonding. The S-TSID may describe only the ROUTE sessions and LCT channels for the broadcast stream in which the S-TSID is delivered. However, if channel bonding is applied, and components of a service are delivered in one or more broadcast streams, the S-TSID associated with the service may describe only the ROUTE sessions and LCT channels for other broadcast streams than the broadcast stream in which the S-TSID is delivered.

For this purpose, the @bsid attribute may be included in the RS element of the S-TSID. @bsid under the RS element may identify a broadcast stream carrying a content component of the broadcast service. If the RS element does not include the @bsid attribute, a default broadcast stream may include a PLP carrying an SLS fragment for this service. The value of this @bsid attribute may be equal to the value of @bsid in the SLT.

Figure 10:
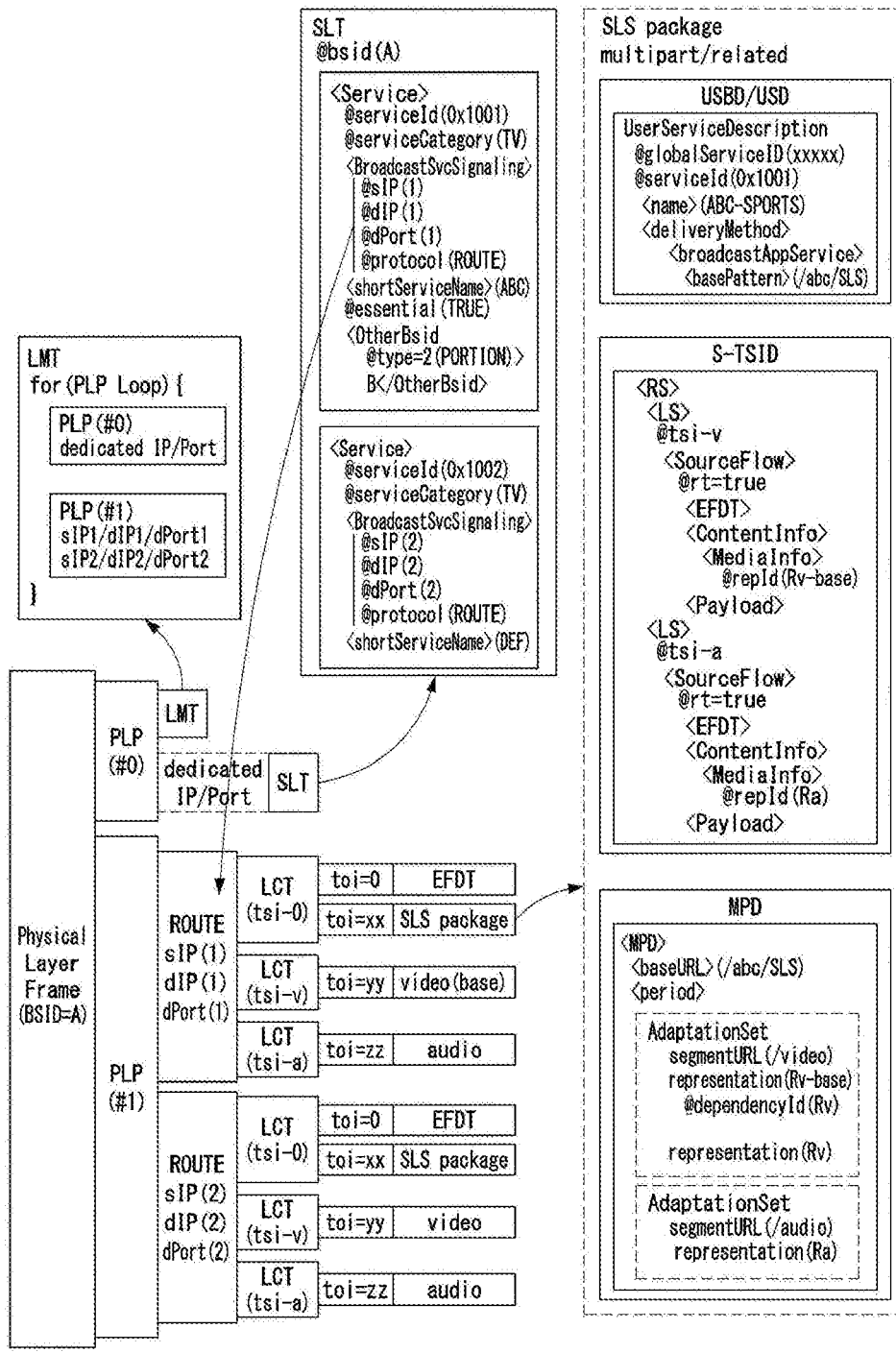
FIGS. 10 and 11 are diagrams illustrating a method of configuring a broadcast signal according to an embodiment of the present disclosure.
Figure 11:
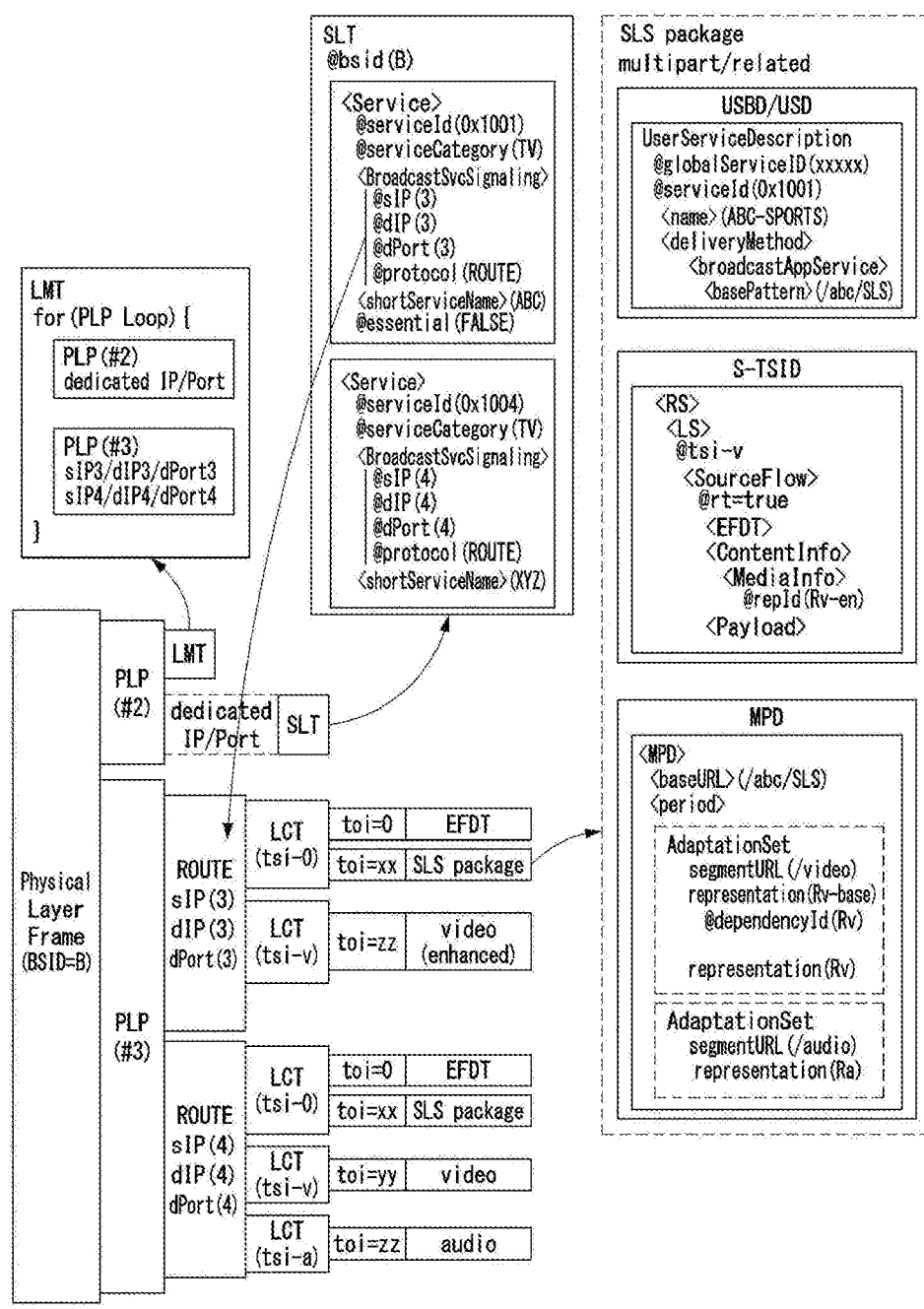

FIGS. 10 and 11 illustrate a method of configuring a broadcast signal according to an embodiment of the present disclosure.

FIG. 10 illustrates a signal frame of channel A in which an essential portion is delivered in an embodiment in which portions of a service are delivered in multiple RF channels without channel bonding.

In FIG. 10, regarding the SLT included in PLP#0 of the signal frame of channel A, a Service element of the SLT associated with an essential portion of a service has an OtherBsid element with @type set to 2. In the SLT of channel A (BSID=A), @essential for the service indicates that a service component delivered in channel A (BSID=A) is an essential portion, and OtherBsid indicates channel B carrying another service portion.

The S-TSID included in PLP#1 of channel A delivering the S-TSID describes LCT channels and ROUTE sessions for components delivered in a broadcast stream.

FIG. 11 illustrates a signal frame of channel B in which a non-essential portion is delivered in an embodiment in which portions of a service are delivered in multiple RF channels without channel bonding.

In FIG. 11, regarding the SLT included in PLP#2 of the signal frame of channel B, a Service element of the SLT associated with an essential portion of a service does not include an OtherBsid element. In the SLT of channel B (BSID=B), @essential for the service indicates that a service component delivered in channel B (BSID=B) is not an essential portion, and there is no OtherBsid. Preferably, the service is provided mainly with the essential portion, and including signaling for the essential portion in a non-essential portion may lead to waste of signaling resources.

The S-TSID included in PLP#3 of channel B delivering the S-TSID describes LCT channels and ROUTE sessions for components delivered in a broadcast stream.

Figure 12:
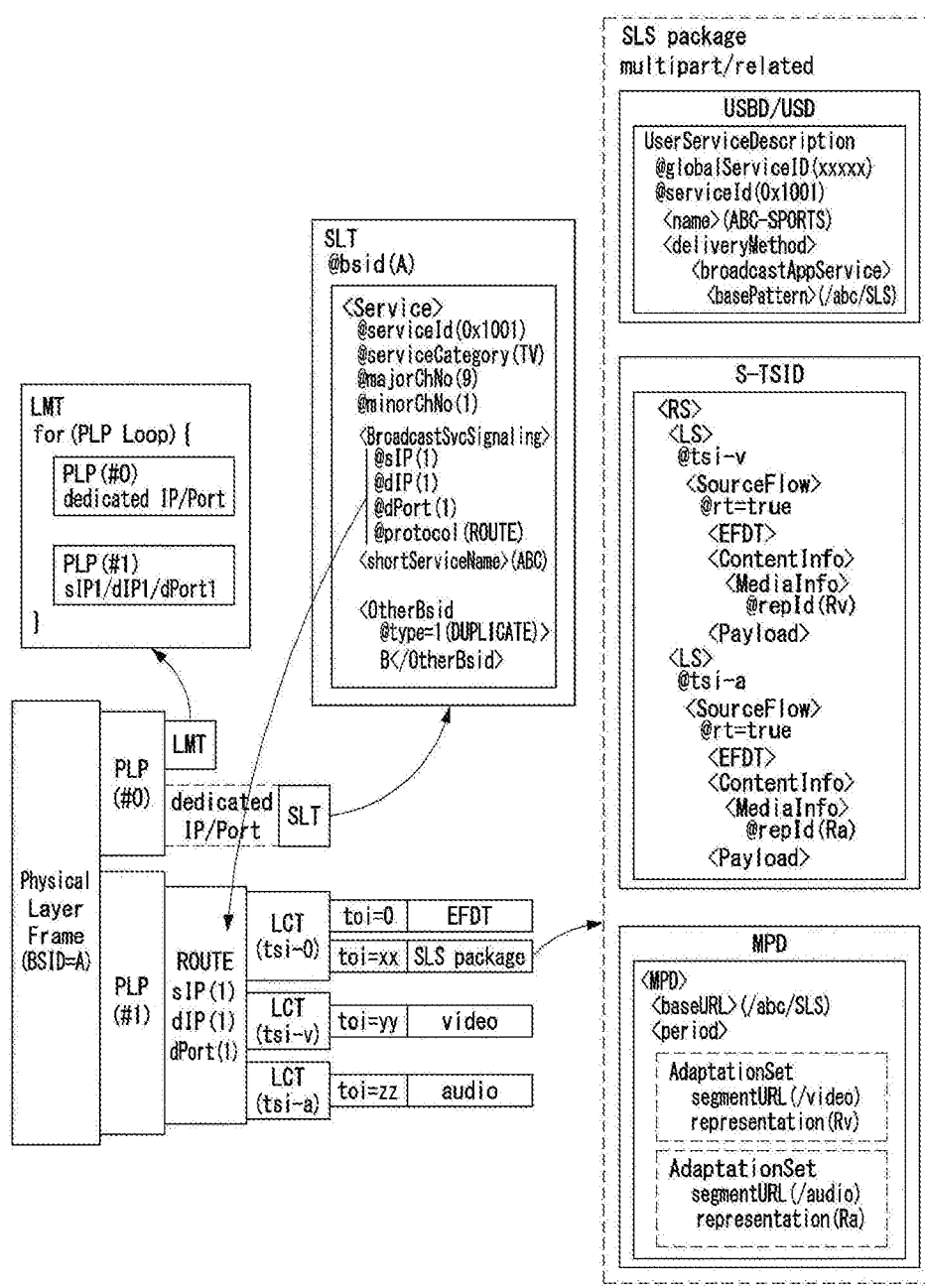
FIGS. 12 and 13 are diagrams illustrating a method of configuring a broadcast signal according to an embodiment of the present disclosure.
Figure 13:
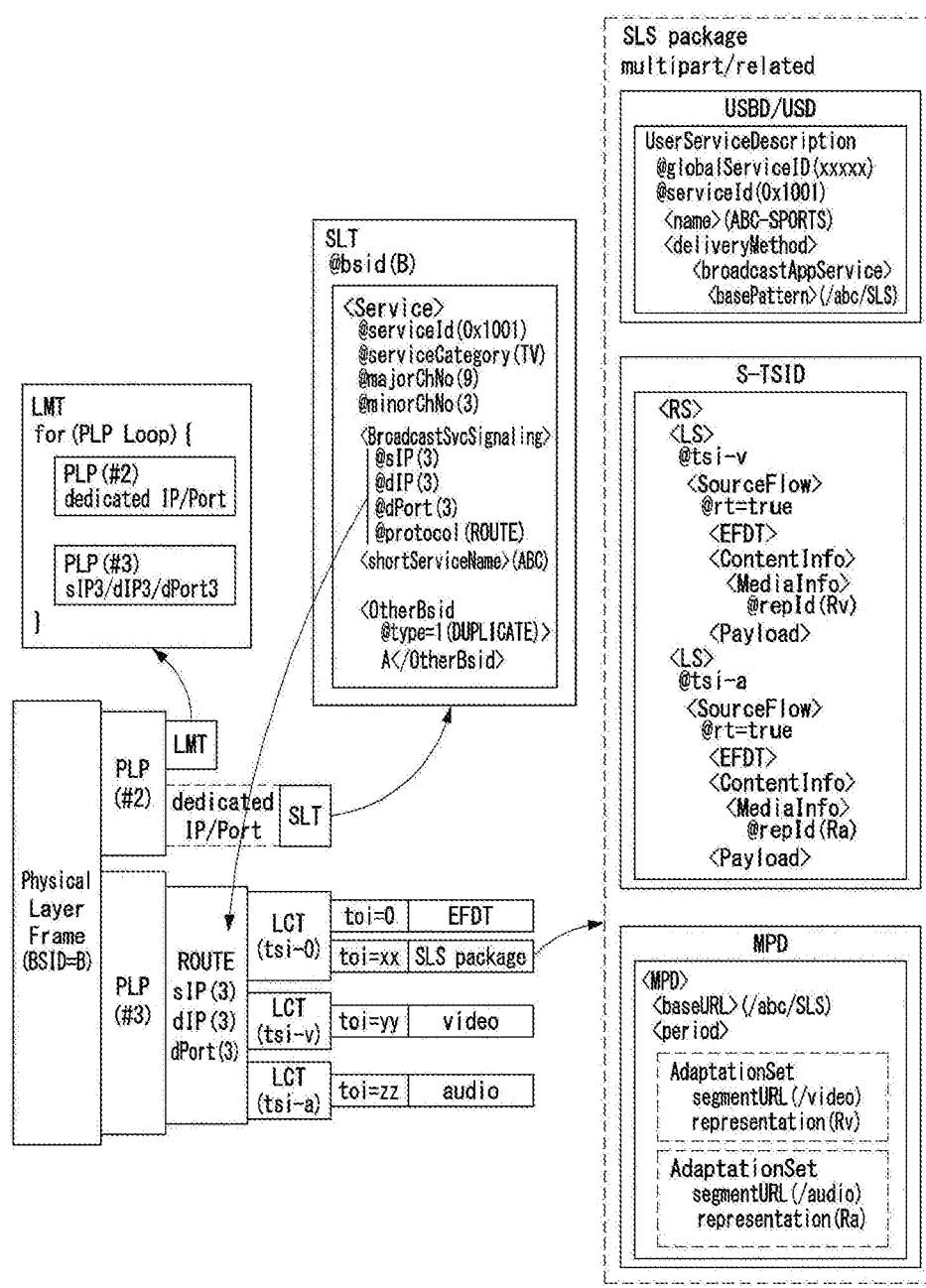

FIGS. 12 and 13 illustrate a method of configuring a broadcast signal according to an embodiment of the present disclosure.

FIG. 12 illustrates a signal frame of channel A carrying a service duplicate with channel number 9(1) in an embodiment in which duplicates of a service are delivered in multiple RF channels without channel bonding.

In FIG. 12, regarding the SLT included in PLP#0 of the signal frame of channel A, a Service element of the SLT associated with a duplicate of a service has an OtherBsid element with @type set to 1. In the SLT of channel A (BSID=A), @essential for the service is omitted, and OtherBsid indicates channel B carrying another service duplicate.

The S-TSID included in PLP#1 of the signal frame of channel A delivering the S-TSID describes LCT channels and ROUTE sessions for components delivered in a broadcast stream.

FIG. 13 illustrates a signal frame of channel B in which a service duplicate with channel number 9(3) is delivered in an embodiment in which duplicates of a service are delivered in multiple RF channels without channel bonding.

In FIG. 13, regarding the SLT included in PLP#2 of the signal frame of channel B, a Service element of the SLT associated with an essential portion of a service includes an OtherBsid element with @type set to 1. In the SLT of channel B (BSID=B), @essential for the service is omitted, and OtherBsid indicates channel A carrying another service duplicate.

The S-TSID included in PLP#3 of the signal frame of channel B delivering the S-TSID describes LCT channels and ROUTE sessions for components delivered in a broadcast stream.

Figure 14:
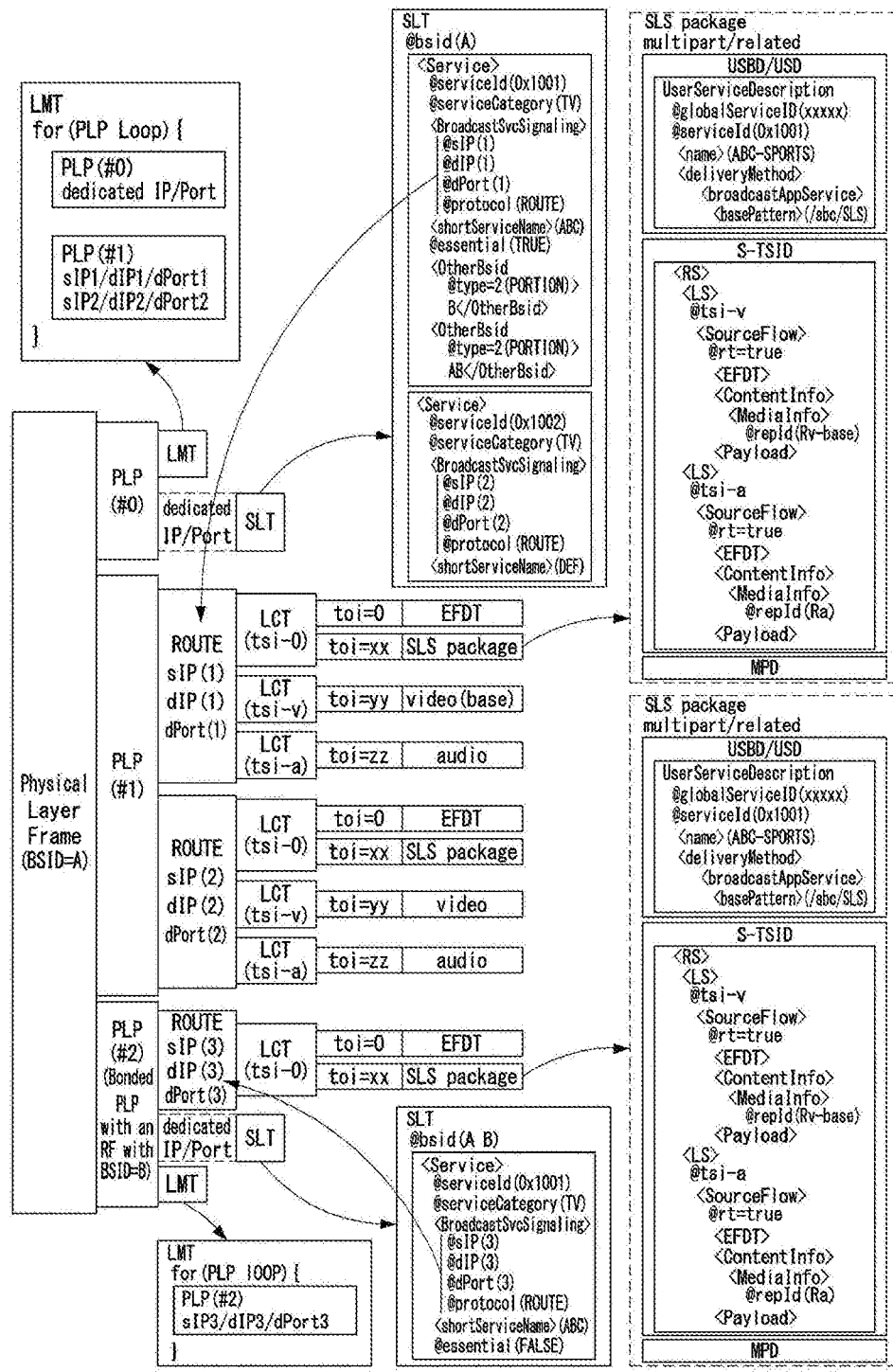
FIGS. 14 and 15 are diagrams illustrating a method of configuring a broadcast signal according to an embodiment of the present disclosure.
Figure 15:
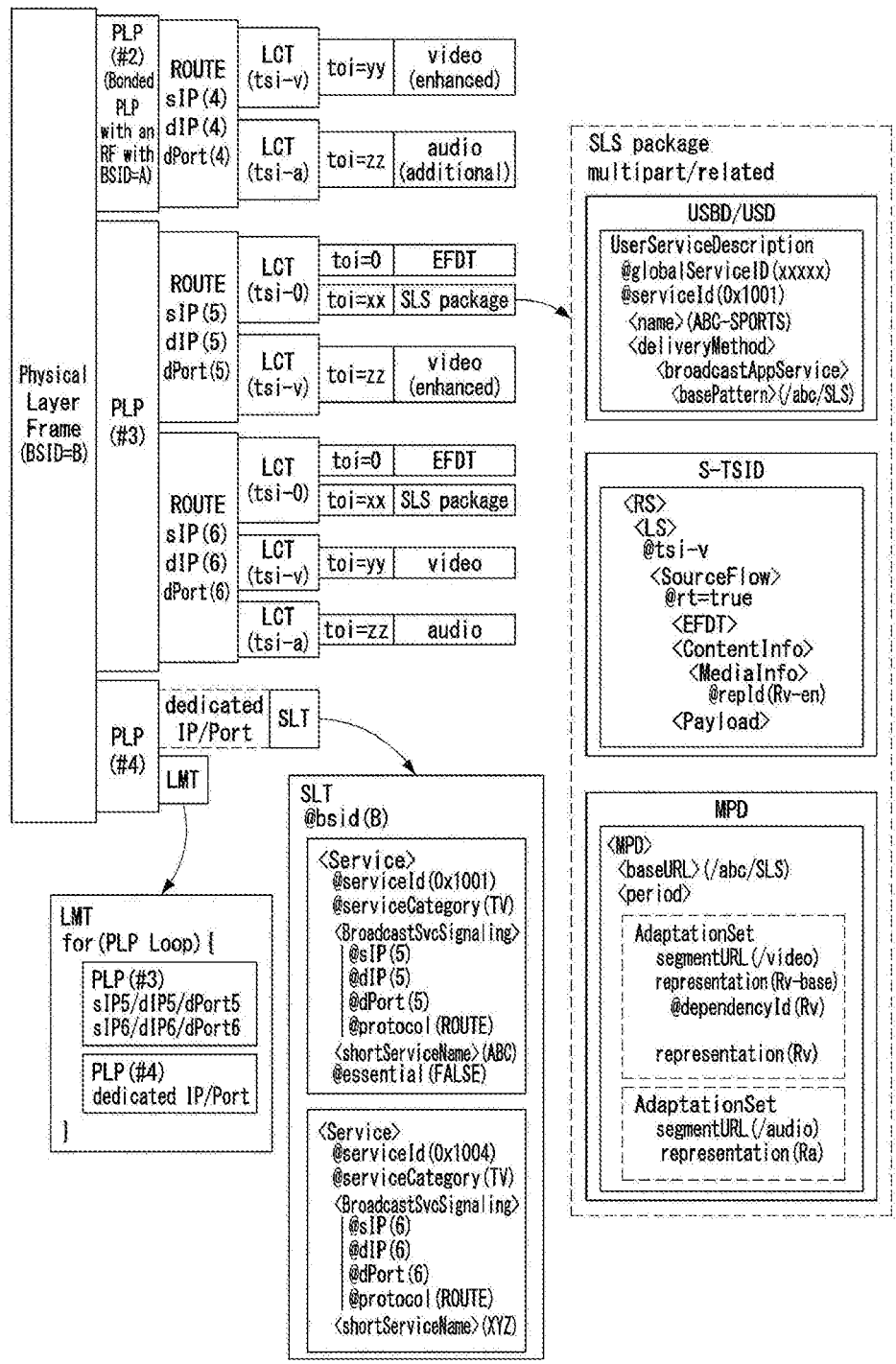

FIGS. 14 and 15 illustrate a method of configuring a broadcast signal according to an embodiment of the present disclosure.

FIG. 14 illustrates a signal frame of channel A carrying an essential portion in a non-bonded PLP in an embodiment in which portions of a service are delivered in multiple RF channels with channel bonding.

In FIG. 14, regarding the SLT included in PLP#0 of the signal frame of channel A, an SLT Service element associated with the essential portion of the service has an OtherBsid element with @type set to 2. In the SLT of channel A (BSID=A), @essential for the service is set to "true" and two OtherBsid elements indicate channel B and channel A B which deliver different service portions, respectively.

The S-TSIDs included in PLP#1 and PLP#2 of the signal frame of channel A, which deliver the S-TSIDs, describe LCT channels and ROUTE sessions for components delivered in a broadcast stream.

The bonded PLP#2 in the signal frame of channel A includes an SLT. The SLT included in the bonded PLP has @bsid set to A B, indicating two channels. @essential is set to "false". As described before, since only an SLT including an essential portion includes OtherBsid information, the SLT of PLP#2 does not include OtherBsid information.

FIG. 15 illustrates a signal frame of channel B carrying a non-essential portion in a bonded PLP in an embodiment in which portions of a service are delivered in multiple RF channels with channel bonding. The signal frame of channel B delivers PLPs corresponding two services (service 0x1001 and service 0x1004). Service 0x1004 may be a non-segmented full service.

In FIG. 15, bonded PLP#2 of the signal frame of channel B and bonded PLP#2 of channel A are transmitted with channel bonding. The SLT included in PLP#4 of the signal frame of channel B includes Service elements for a plurality of services. The Service elements indicate that service 0x1001 is a non-essential portion, and service 0x1004 is a non-segmented full service.

The S-TSID included in PLP#3 of the signal frame of channel B, which delivers the S-TSID, describes LCT channels and ROUTE sessions for components delivered in a broadcast stream.

Figure 16:
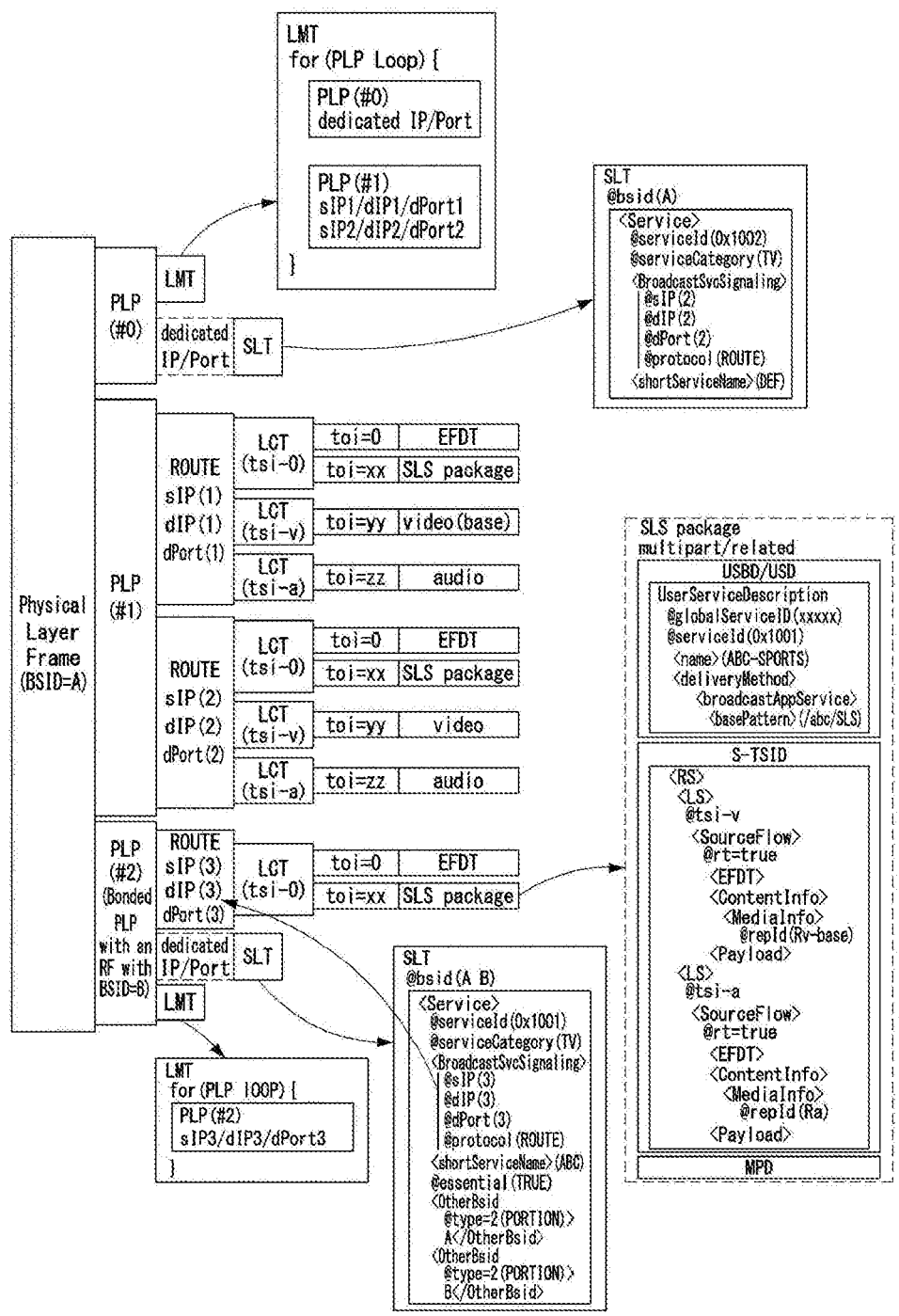
FIGS. 16 and 17 are diagrams illustrating a method of configuring a broadcast signal according to an embodiment of the present disclosure.
Figure 17:
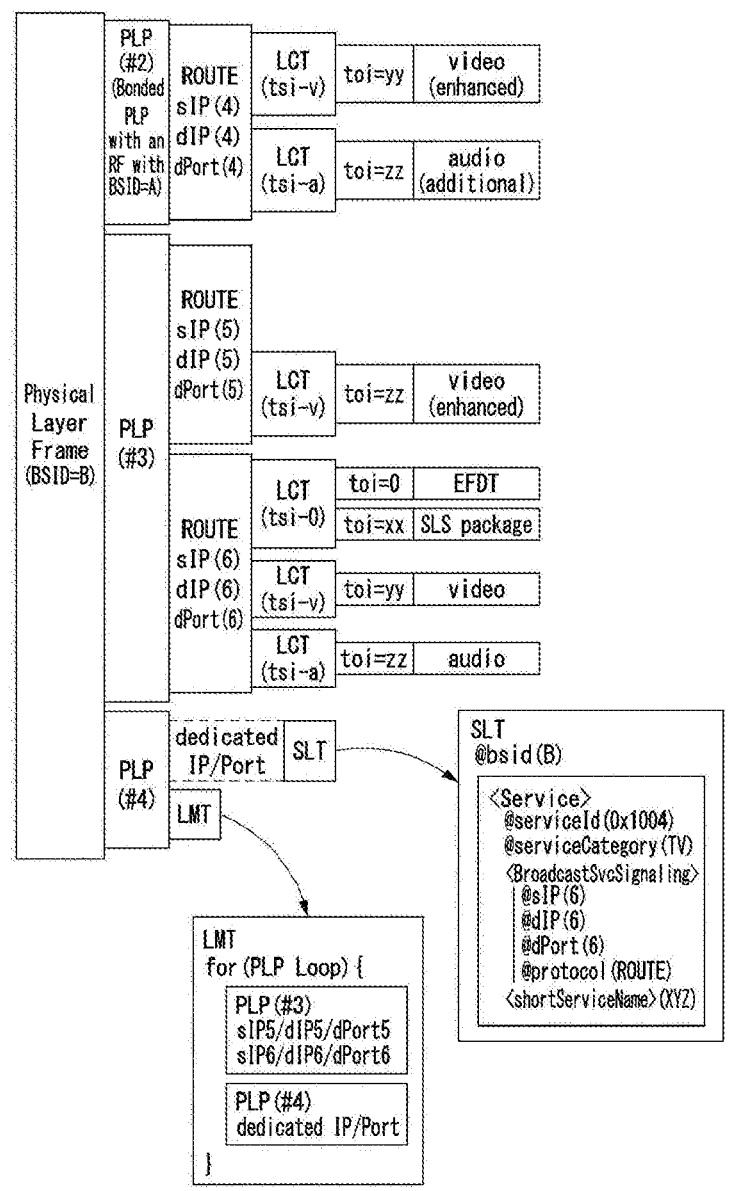

FIGS. 16 and 17 illustrate a method of configuring a broadcast signal according to an embodiment of the present disclosure.

FIG. 16 illustrates a signal frame of channel A carrying an essential portion in a bonded PLP in an embodiment in which portions of a service are delivered in multiple RF channels with channel bonding. The signal frame of channel A includes an SLT for non-bonded portions and an SLT for bonded portions.

In FIG. 16, regarding the SLT included in bonded PLP#2 of the signal frame of channel A, the SLT Service element associated with an essential portion of the service has OtherBsid elements with @type set to 2. In the SLT of channel A (BSID=A), @essential for the service is set to "true" and two OtherBsid elements indicate channel B and channel B which deliver other service portions, respectively.

The S-TSIDs included in PLP#1 and PLP#2 of the signal frame of channel A, which deliver the S-TSIDs, describe LCT channels and ROUTE sessions for components delivered in a broadcast stream.

PLP#0 in the signal frame of channel A includes an SLT. The SLT of PLP#0 does not describe a service of a bonded PLP. Only an SLT associated with the essential portion of the service lists the service. The BSID of the SLT associated with the bonded PLP may indicate two channels "A B".

FIG. 17 illustrates a signal frame of channel B carrying an essential portion in a bonded PLP in an embodiment in which portions of a service are delivered in multiple RF channels with channel bonding. The signal frame of channel B delivers PLPs corresponding two services (service 0x1001 and service 0x1004). Service 0x1004 may be a non-segmented full service.

In FIG. 17, bonded PLP#2 of the signal frame of channel B and bonded PLP#2 of channel A are transmitted with channel bonding. The SLT included in PLP#4 of the signal frame of channel B includes a Service element for a non-channel-bonded service.

Figure 18:
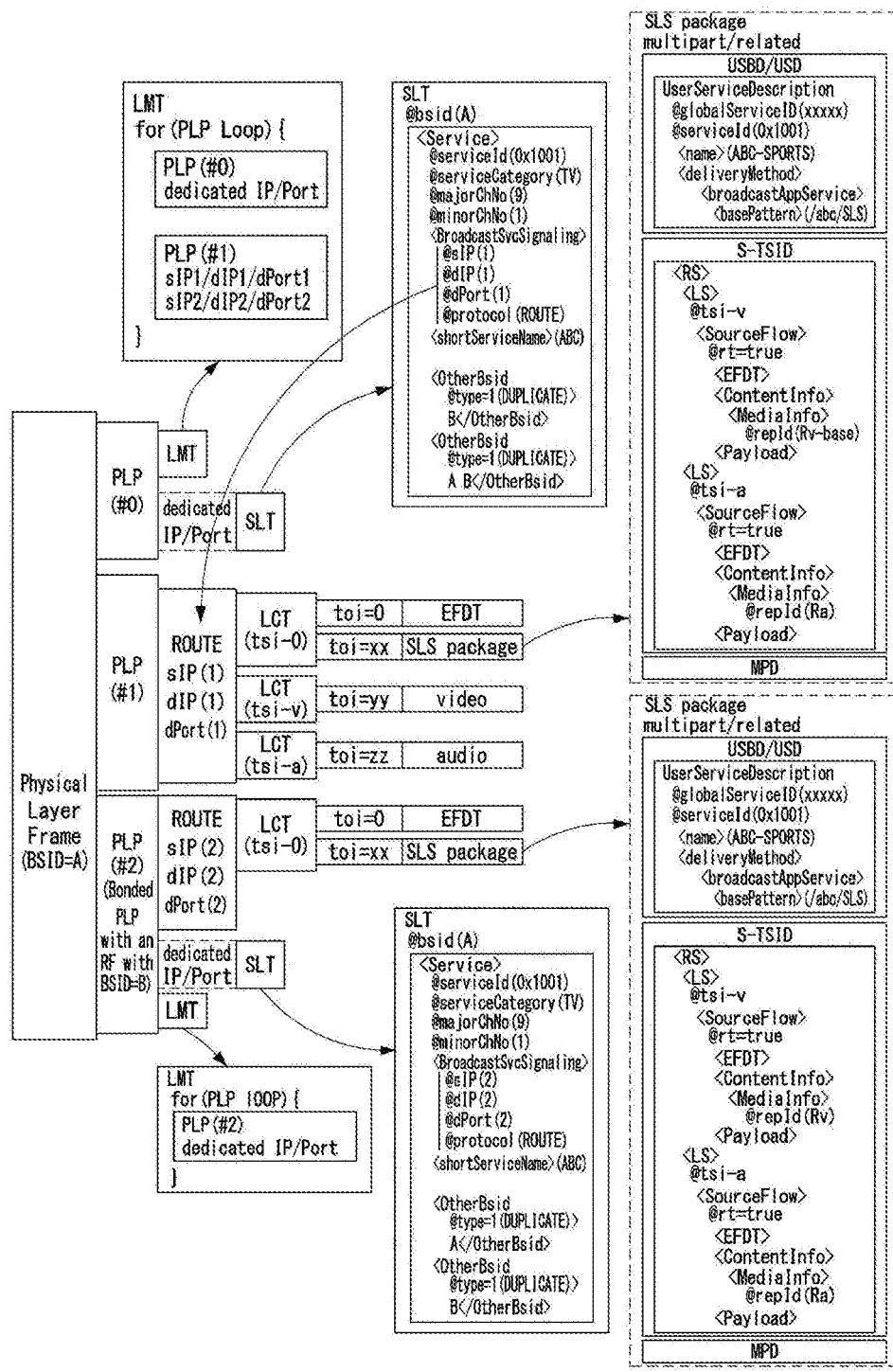
FIGS. 18 and 19 are diagrams illustrating a method of configuring a broadcast signal according to an embodiment of the present disclosure.
Figure 19:
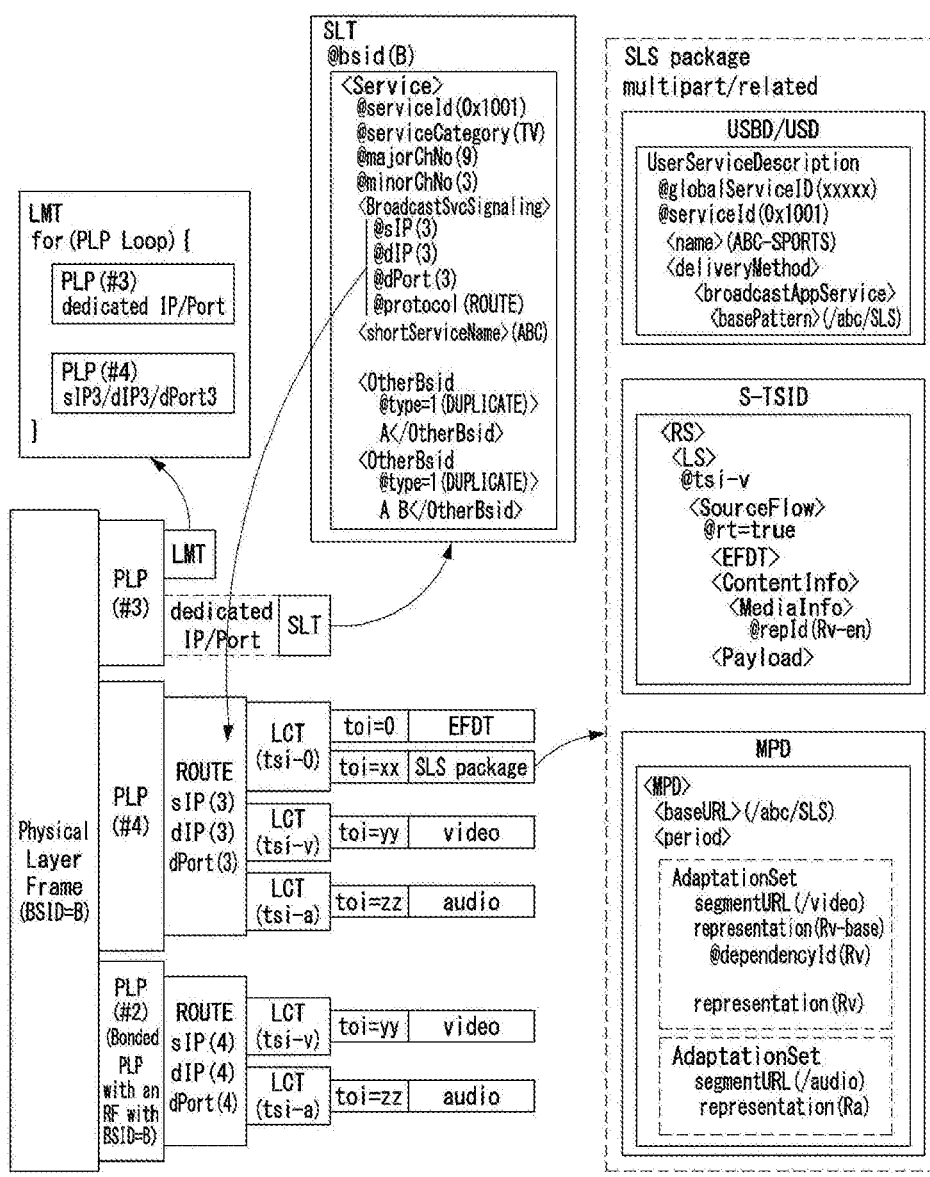

FIGS. 18 and 19 illustrate a method of configuring a broadcast signal according to an embodiment of the present disclosure.

FIG. 18 illustrates a signal frame of channel A carrying a service duplicate in a bonded PLP in an embodiment in which duplicates of a service are delivered in multiple RF channels with channel bonding. The signal frame of channel A includes an SLT for non-bonded portions and an SLT for bonded portions.

In FIG. 18, regarding the SLT included in PLP#0 of the signal frame of channel A, the SLT Service element associated with a duplicate of the service has an OtherBsid element with @type set to 1. In the SLT of channel A (BSID=A), there may not be @essential for the service. Two OtherBsid elements indicate channel B and channel A B which deliver other service duplicates, respectively.

The S-TSIDs included in PLP#1 and PLP#2 of the signal frame of channel A, which deliver the S-TSIDs, describe LCT channels and ROUTE sessions for components delivered in a broadcast stream.

Bonded PLP#2 in the signal frame of channel A includes an SLT. The SLT included in the bonded PLP has @bsid set to A. In an embodiment, the SLT included in the bonded PLP may have @bsid set to A B, indicating two channels. There may be no @essential attribute. Regarding the SLT included in bonded PLP#2 of the signal frame of channel A, the SLT Service element associated with a duplicate of the service has OtherBsid elements with @type set to 1. In the SLT of bonded PLP#2, the two OtherBsid elements indicate channel A and channel B which deliver other service duplicates, respectively.

FIG. 19 illustrates a signal frame of channel B carrying a service duplicate in a bonded PLP in an embodiment in which duplicates of a service are delivered in multiple RF channels with channel bonding. The signal frame of channel B delivers PLPs carrying duplicates of the service with different channel numbers.

In FIG. 19, bonded PLP#2 of the signal frame of channel B and bonded PLP#2 of channel A are transmitted with channel bonding. The SLT included in PLP#4 of the signal frame of channel B includes a Service element for a service. Further, the SLT of PLP#4 includes OtherBsid elements indicating broadcast streams carrying other duplicates of the service. In the SLT of bonded PLP#4, the two OtherBsid elements indicate channel A and channel A B which deliver other service duplicates, respectively.

Figure 20:
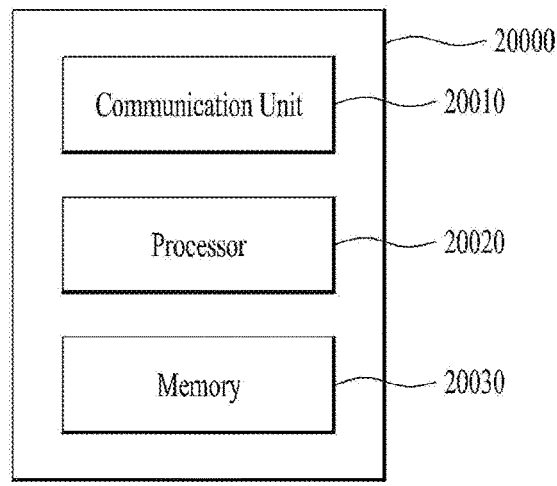
FIG. 20 is a block diagram illustrating a configuration of a broadcast signal transmission/reception apparatus according to an embodiment of the present disclosure.

FIG. 20 is a block diagram of a broadcast signal transmission/reception apparatus according to an embodiment of the present disclosure.

In FIG. 20, a broadcast signal transmission/reception apparatus 20000 may include a communication unit 20010, a processor 20020, and a memory 20030.

The communication unit 20010 may be connected to the processor 20020, and transmit/receive a broadcast signal. The communication unit 20010 of the broadcast signal transmission apparatus may upconvert data received from the processor 20020 to a transmission/reception band, and transmit the upconverted signal. The communication unit 20010 of the broadcast signal reception apparatus may downconvert received data and transmit the downconverted data to the processor 20020. The communication unit 20010 may receive an audio/video signal wiredly. The communication unit 20010 may include at least one of a communication unit for wireless communication and a communication unit for wired communication. The communication unit 20010 may perform the physical layer processing described before with reference to FIG. 8. In an embodiment, the communication unit 20010 may perform the link layer processing described before with reference to FIGS. 6 and 7.

The processor 20020 may be connected to the communication unit 20010, and implement the broadcast signal processing technology of the ATSC 3.0 system. The processor 20020 may be configured to perform the operations according to various embodiments of the present disclosure, based on the afore-described drawings and the foregoing description. Further, a module that implements the operations of the broadcast signal transmission/reception apparatus 20000 according to various embodiments of the present disclosure may be stored in the memory 20030, and executed by the processor 20020.

The memory 20030 is connected to the processor 20020, and stores various types of information to operate the processor 20020. The memory 20030 may reside inside or outside the processor 20020, and may be connected to the processor 2002 by well-known means. The broadcast signal transmission/reception apparatus 20000 may be implemented such that the foregoing various embodiments of the present disclosure are applied independently or two or more of them are applied at the same time.

Now, a description will be given of a broadcast signal transmission method and a broadcast signal reception method in the broadcast signal transmission/reception apparatus 20000. The broadcast signal transmission apparatus may also be referred to as a broadcast signal transmitter, and the broadcast signal reception apparatus may also be referred to as a broadcast signal receiver.

Figure 21:
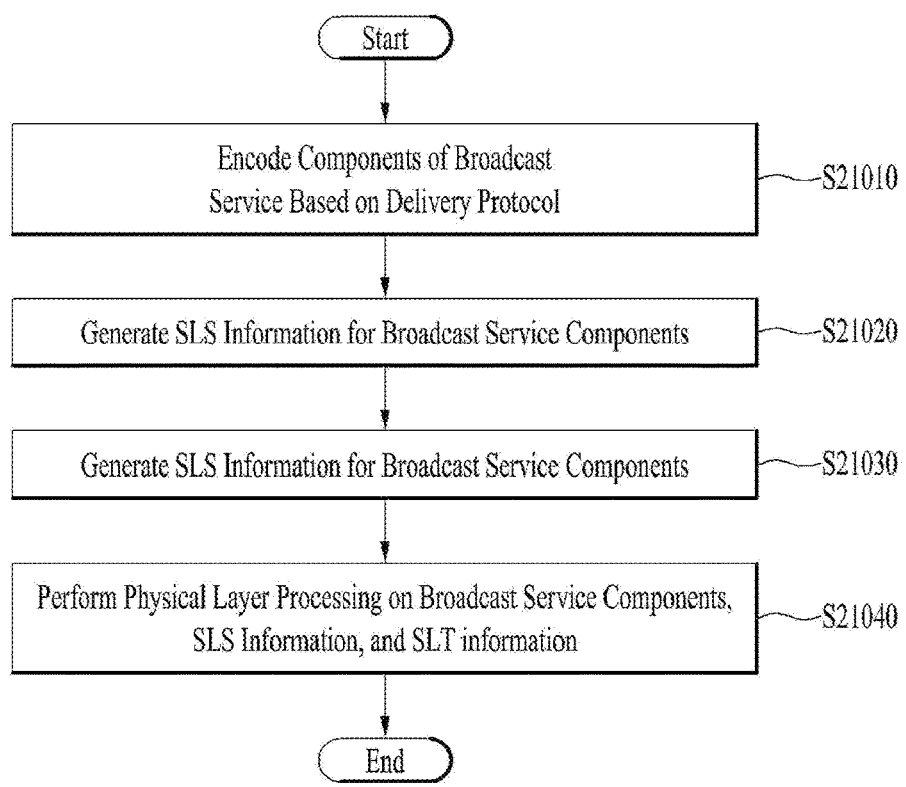
FIG. 21 is a flowchart illustrating a broadcast signal transmission method according to an embodiment of the present disclosure.

FIG. 21 illustrates a broadcast signal transmission method according to an embodiment of the present disclosure.

Various embodiments of broadcast signal transmission described before with reference to FIGS. 1 to 20 are applicable to the broadcast signal transmission method illustrated in FIG. 21.

The broadcast signal transmitter may encode a component of a broadcast service based on a delivery protocol (S21010). The delivery protocol may include at least one of a ROUTE protocol or an MMT protocol.

The broadcast signal transmitter may generate SLS information for the broadcast service component (S21020). The SLS information includes information for discovering and acquiring at least one component of the broadcast service. The SLS information may include S-TSID information including description information about a session that delivers at least one component of the broadcast service.

The broadcast signal transmitter may generate SLT information for the broadcast service (S21030). The SLT information includes bootstrap information for acquiring the SLS information.

The broadcast signal transmitter may perform physical layer processing on the component of the broadcast service, the SLS information, and the SLT information (S21040). The broadcast signal transmitter may generate a signal frame including a PLP by performing physical layer processing on higher-layer data.

If components of the broadcast service are transmitted in multiple RF channels, a set of the components correspond to a service portion including some components of the service or a service duplicate including all components of the service. The service portion corresponds to a non-essential portion, or an essential portion with which the service may be presented without the use of the other portions.

If service portions or service duplicates of the broadcast service are transmitted in multiple channels, the physical layer processing may include selectively performing channel bonding by distributing one PLP including a service portion or a service duplicate to a plurality of channels. The service portion or the service duplicate may be delivered in a single channel without channel bonding or in the plurality of channels with channel bonding.

If the service portion or the service duplicate is delivered without channel bonding, an SLT of a channel delivering the service portion or the service duplicate may describe the service portion or the service duplicate, and a PLP of each channel delivering the service portion or the service duplicate may include S-TSID information for the service portion or the service duplicate.

In the case where a service portion is delivered with channel boding, if an essential portion is delivered in a non-bonded PLP, a plurality of pieces of SLT information associated with a non-bonded PLP and a bonded PLP which deliver any portions of the service may list the service, and only SLT information for the essential portion may list the broadcast stream ID (BSID) of a broadcast stream delivering another portion. In the case where a service portion is delivered with channel bonding, if the essential portion is delivered in a bonded PLP, one piece of SLT information associated with the bonded PLP delivering the essential portion may list the service, and the SLT information may list the BSID of a broadcast stream delivering another portion. In the case where a service duplicate is delivered with channel bonding, a plurality of pieces of SLT information associated with a non-bonded PLP and a bonded PLP that deliver duplicates of the service may list the service, and each piece of SLT information for the service duplicates may list the BSID of a broadcast stream delivering another service duplicate.

In the case where service components are delivered in a plurality of broadcast streams of multiple broadcast channels, and channel bonding is applied to the components, an S-TSID may describe information about a session and a channel for components delivered in a broadcast stream other than a broadcast stream delivering the S-TSID.

Figure 22:
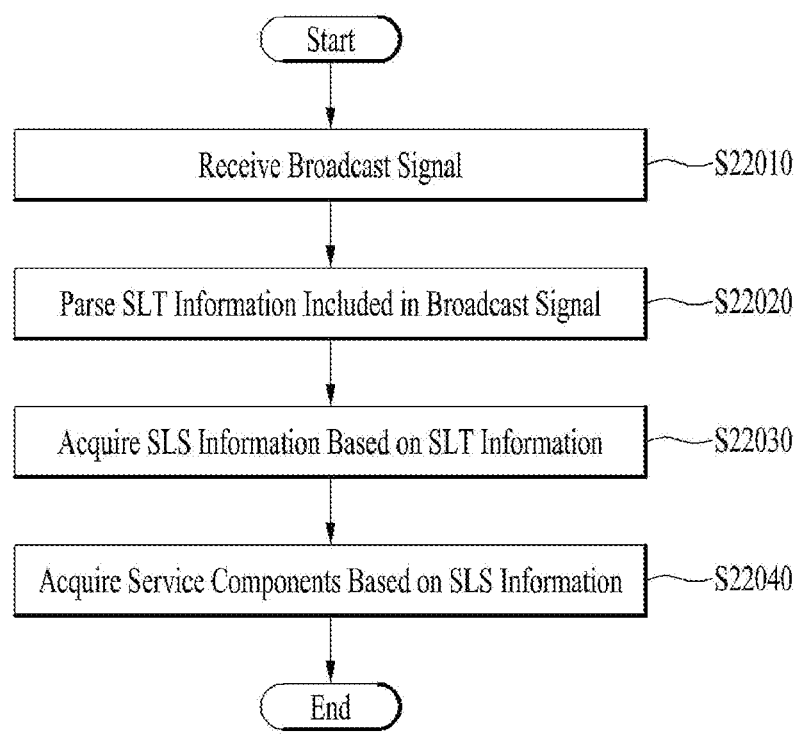
FIG. 22 is a flowchart illustrating a broadcast signal reception method according to an embodiment of the present disclosure.

FIG. 22 illustrates a broadcast signal reception method according to an embodiment of the present disclosure.

Various embodiments of broadcast signal reception described before with reference to FIGS. 1 to 20 are applicable to the broadcast signal reception method illustrated in FIG. 22.

The broadcast signal receiver may receive a broadcast signal (S22010). The broadcast signal receiver may receive a broadcast signal by tuning to a specific channel, and may receive a plurality of broadcast streams by simultaneously tuning to a plurality of channels. In addition, the broadcast signal receiver may perform physical layer processing on the received broadcast signal.

The broadcast signal receiver may parse SLT information included in the broadcast signal (S22020). The SLT information includes bootstrap information for acquiring SLS information.

The broadcast signal receiver may acquire the SLS information based on the SLT information (S22030). The SLS information includes information for discovering and acquiring at least one component of a broadcast service.

The broadcast signal receiver may acquire a service component based on the SLS information (S22040).

If components of the broadcast service are received in multiple RF channels, a set of the components correspond to a service portion including some components of the service or a service duplicate including all components of the service. The service portion corresponds to a non-essential portion, or an essential portion with which the service may be presented without the use of the other portions.

If service portions or service duplicates of the broadcast service are received in multiple channels, the physical layer processing may include selectively performing channel bonding by distributing one PLP including a service portion or a service duplicate to a plurality of channels. The service portion or the service duplicate may be delivered in a single channel without channel bonding or in the plurality of channels with channel bonding.

If the service portion or the service duplicate is delivered without channel bonding, an SLT of a channel delivering the service portion or the service duplicate may describe the service portion or the service duplicate, and a PLP of each channel delivering the service portion or the service duplicate may include S-TSID information for the service portion or the service duplicate.

In the case where a service portion is delivered with channel boding, if the essential portion is delivered in a non-bonded PLP, a plurality of pieces of SLT information associated with a non-bonded PLP and a bonded PLP which deliver any portions of the service may list the service, and only SLT information for the essential portion may list the broadcast stream ID (BSID) of a broadcast stream delivering another portion. In the case where a service portion is delivered with channel boding, if the essential portion is delivered in a bonded PLP, one piece of SLT information associated with the bonded PLP delivering the essential portion may list the service, and the SLT information may list the BSID of a broadcast stream delivering another portion. In the case where a service duplicate is delivered with channel bonding, a plurality of pieces of SLT information associated with a non-bonded PLP and a bonded PLP that deliver duplicates of the service may list the service, and each piece of SLT information for the service duplicates may list the BSID of a broadcast stream delivering another service duplicate.

In the case where service components are delivered in a plurality of broadcast streams of multiple broadcast channels, and channel bonding is applied to the components, an S-TSID may describe information about a session and a channel for a component delivered in a broadcast stream other than a broadcast stream delivering the S-TSID.

The present disclosure proposes a signaling method for transmitting and receiving a service in multiple channels. The present disclosure proposes a method of signaling an additional service and a duplicate in one service, so that various services may be transmitted in multiple channels. A receiver may acquire various portions/duplicates corresponding to the service by using signaling information.

When channel bonding is applied to a broadcast signal, the receiver needs signaling information related to the channel bonding. However, it is preferable to minimize unnecessary signaling information. Accordingly, when channel bonding is applied, a signal structure is determined based on what carries an essential portion in the present disclosure. In conclusion, the present disclosure may provide a signaling structure that optimizes a broadcast signal configuration according to multiple channel transmission and channel bonding.

Each step described in the foregoing embodiments may be performed by hardware/processors. Each module/block/unit described in the foregoing embodiments may operate in hardware/as a processor. Further, the methods provided by the present disclosure may be executed as code. The code may be written to a processor-readable storage medium, and thus read by a processor of an apparatus.

While the drawings have been described separately for the convenience of description, it is possible to implement a new embodiment by combining the embodiments illustrated in the drawings. The apparatuses and methods according to the present disclosure are not intended to limit the configurations and methods of the foregoing embodiments. Rather, all or a part of the embodiments may be selectively combined so that many modifications are made to the embodiments.

While preferred embodiments of the present disclosure have been described above, the present disclosure is not limited to the specific embodiments. Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will understand that many variations and modifications can be made to the present disclosure. Therefore, the present disclosure is intended to embrace modifications and variations within the scope of the appended claims and their equivalents.

In the specification, both a device invention and a method invention are mentioned, and their descriptions are applicable complementarily.

Mode for Carrying Out the Invention

Various embodiments have been described in the best mode for carrying out the invention.

Industrial Applicability

The present disclosure is used in the field of broadcast signal transmission/reception.

It is obvious to those skilled in the art that many modifications and variations may be made to the disclosure within the scope and spirit of the disclosure. Accordingly, it is to be understood that the disclosure is intended to embrace various modifications and variations falling within the scope of the appended claims and their equivalents

The invention claimed is:

1. A method of transmitting a broadcast signal by an apparatus, the method comprising:
generating service layer signaling (SLS) information including information about at least one component of a broadcast service in the broadcast signal, the SLS information including service-based transport session instance description (S-TSID) information including description information about a session delivering the at least one component of the broadcast service;
generating service list table (SLT) information including bootstrap information for acquiring the SLS information,
wherein the SLT information includes a broadcast stream identifier (BSID) representing a first broadcast stream including the broadcast service;
transmitting, via radio frequency (RF) channels, a broadcast signal including the at least one component, the SLS information, and the SLT information, wherein the SLT information further includes essential information representing whether or not an essential portion of the broadcast service is delivered via a broadcast stream of the BSID, the essential portion providing presentation of the broadcast service without other portions, and the SLT information further including an OtherBSID representing a second broadcast stream delivering a duplicate or a portion of the broadcast service, wherein a portion of the broadcast service represents a set of components of the broadcast service that is a part of components of the broadcast service, and wherein the duplicate of the broadcast service represents a set of components of the broadcast service that includes all components of the broadcast service, wherein the SLT information and the S-TSID information are provided for a_portion or a duplicate that is transmitted without channel bonding; and wherein the SLT information associated with a non-bonded physical layer pipe (PLP) and a bonded PLP, which deliver duplicates that are transmitted with the channel bonding, list the broadcast service, and the SLT information for the duplicate lists a BSID of a broadcast stream delivering another duplicate.

2. The method according to claim 1,
wherein, when the more than one portion are delivered in multiple RF channels without channel bonding, the SLT information includes a first BSID of a first broadcast stream for a first RF channel, essential information having a first value representing that essential portion of the broadcast service is delivered via the first broadcast stream and OtherBSID with type information having a second value representing a portion of a broadcast service which has components in the first broadcast stream identified by the OtherBSID.

3. The method according to claim 1,
wherein, when duplicates of the broadcast service are delivered in multiple RF channels without channel bonding, the SLT information includes a first BSID of a first broadcast stream for a first RF channel and OtherBSID with type information having a third value representing a duplicate of the broadcast service.

4. The method according to claim 1,
wherein, if the portion or the duplicate of the broadcast service is transmitted in the RF channels, one PLP including the portion or the duplicate is distributed to the RF channels based on a channel bonding,
wherein the portion or the duplicate is delivered in a single channel without the channel bonding, or in the RF channels with the channel bonding, and
wherein, if the portion is delivered with the channel bonding, when the essential portion is delivered in a bonded PLP, one piece of SLT information associated with the bonded PLP delivering the essential portion lists the broadcast service, and lists a BSID of a broadcast stream delivering another portion.

5. The method according to claim 4,
wherein, if the portion is delivered with channel bonding, when the essential portion is delivered in a non-bonded PLP, a plurality of pieces of SLT information associated with a non-bonded PLP and a bonded PLP which deliver any portions of the broadcast service list the broadcast service, and only SLT information for the essential portion lists a BSID of a broadcast stream delivering another portion, and
wherein, if the components are delivered in a plurality of broadcast streams of multiple broadcast channels, and channel bonding is applied to the components, the S-TSID information describes information about a session and a channel for a component delivered in a broadcast stream other than a broadcast stream delivering the S-TSID information.

6. A broadcast signal transmission apparatus comprising:
a generator, stored on a hardware memory and executed by a hardware processor, configured to generate service layer signaling (SLS) information including information about at least one component of a broadcast service in the broadcast signal, the SLS information including service-based transport session instance description (S-TSID) information including description information about a session delivering the at least one component of the broadcast service;
generate service list table (SLT) information including bootstrap information for acquiring the SLS information,
wherein the SLT information includes a broadcast stream identifier (BSID) representing a first broadcast stream including the broadcast service;
transmit, via radio frequency (RF) channels, a broadcast signal including the at least one component, the SLS information, and the SLT information, wherein the SLT information further includes essential information representing whether or not an essential portion of the broadcast service is delivered via a broadcast stream of the BSID, the essential portion providing presentation of the broadcast service without other portions, and the SLT information further including an OtherBSID representing a second broadcast stream delivering a duplicate or a portion of the broadcast service, wherein a portion of the broadcast service represents a set of components of the broadcast service that is a part of components of the broadcast service, and wherein the duplicate of the broadcast service represents a set of components of the broadcast service that includes all components of the broadcast service,
wherein the SLT information and the S-TSID information are provided for a portion or a duplicate that is transmitted without channel bonding; and
wherein the SLT information associated with a non-bonded physical layer pipe (PLP) and a bonded PLP which deliver duplicates that are transmitted with the channel bonding, list the broadcast service, and the SLT information for the duplicate lists a BSID of a broadcast stream delivering another duplicate.

7. The broadcast signal transmission apparatus according to claim 6,
wherein, when the more than one portion are delivered in multiple RF channels without channel bonding, the SLT information includes a first BSID of a first broadcast stream for a first RF channel, essential information having a first value representing that essential portion of the broadcast service is delivered via the first broadcast stream and OtherBSID with type information having a second value representing a portion of a broadcast service which has components in the first broadcast stream identified by the OtherBSID.

8. The broadcast signal transmission apparatus according to claim 6,
wherein, when duplicates of the broadcast service are delivered in multiple RF channels without channel bonding, the SLT information includes a first BSID of a first broadcast stream for a first RF channel and OtherBSID with type information having a third value representing a duplicate of the broadcast service.

9. The broadcast signal transmission apparatus according to claim 6,
wherein, if the portion or the duplicate of the broadcast service is transmitted in the RF channels, one PLP including the portion or the duplicate is distributed to the RF channels based on a channel bonding, wherein the portion or the duplicate is delivered in a single channel without the channel bonding, or in the RF channels with the channel bonding, and wherein, if the portion is delivered with the channel bonding, when the essential portion is delivered in a bonded PLP, one piece of SLT information associated with the bonded PLP delivering the essential portion lists the broadcast service, and lists a BSID of a broadcast stream delivering another portion.

10. The broadcast signal transmission apparatus according to claim 9, wherein, if the portion is delivered with channel bonding, when the essential portion is delivered in a non-bonded PLP, a plurality of pieces of SLT information associated with a non-bonded PLP and a bonded PLP which deliver any portions of the broadcast service list the broadcast service, and only SLT information for the essential portion lists a BSID of a broadcast stream delivering another portion, and wherein, if the components are delivered in a plurality of broadcast streams of multiple broadcast channels, and channel bonding is applied to the components, the S-TSID information describes information about a session and a channel for a component delivered in a broadcast stream other than a broadcast stream delivering the S-TSID information.

11. A method for receiving a broadcast signal by an apparatus, the method comprising:

receiving, via radio frequency (RF) channels, a broadcast signal including at least one component, service layer signaling (SLS) information including information about the at least one component of a broadcast service in the broadcast signal, the SLS information including service-based transport session instance description (S-TSID) information including description information about a session delivering the at least one component of the broadcast service and service list table (SLT) information including bootstrap information for acquiring the SLS information, the SLS information and the SLT information are generated at a transmitting system;

wherein the SLT information includes a broadcast stream identifier (BSID) representing a first broadcast stream including the broadcast service, wherein the SLT information further includes essential information representing whether or not an essential portion of the broadcast service is delivered via a broadcast stream of the BSID, the essential portion providing presentation of the broadcast service without other portions, and the SLT information further including an OtherBSID representing a second broadcast stream delivering a duplicate or a portion of the broadcast service, wherein a portion of the broadcast service represents a set of components of the broadcast service that is a part of components of the broadcast service, and wherein the duplicate of the broadcast service represents a set of components of the broadcast service that includes all components of the broadcast service, wherein the SLT information and the S-TSID information are provided for a portion or a duplicate that is transmitted without channel bonding, and wherein the SLT information associated with a non-bonded physical layer pipe (PLP) and a bonded PLP, which deliver duplicates that are transmitted with the channel bonding, list the broadcast service, and the SLT information for the duplicate lists a BSID of a broadcast stream delivering another duplicate; and decoding the broadcast signal.

12. An apparatus for receiving a broadcast signal, the apparatus comprising:

a receiver, stored on a hardware memory and executed by a hardware processor, configured to receive, via radio frequency (RF) channels, a broadcast signal including at least one component, service layer signaling (SLS) information including information about the at least one component of a broadcast service in the broadcast signal, the SLS information including service-based transport session instance description (S-TSID) information including description information about a session delivering the at least one component of the broadcast service and service list table (SLT) information including bootstrap information for acquiring the SLS information, the SLS information and the SLT information are generated at a transmitting system;

wherein the SLT information includes a broadcast stream identifier (BSID) representing a first broadcast stream including the broadcast service, wherein the SLT information further includes essential information representing whether or not an essential portion of the broadcast service is delivered via a broadcast stream of the BSID, the essential portion providing presentation of the broadcast service without other portions, and the SLT information further including an OtherBSID representing a second broadcast stream delivering a duplicate or a portion of the broadcast service, wherein a portion of the broadcast service represents a set of components of the broadcast service that is a part of components of the broadcast service, and wherein the duplicate of the broadcast service represents a set of components of the broadcast service that includes all components of the broadcast service, wherein the SLT information and the S-TSID information are provided for a portion or a duplicate that is transmitted without channel bonding, and wherein the SLT information associated with a non-bonded physical layer pipe (PLP) and a bonded PLP, which deliver duplicates that are transmitted with the channel bonding, list the broadcast service, and the SLT information for the duplicate lists a BSID of a broadcast stream delivering another duplicate; and a decoder, stored on the hardware memory and executed by the hardware processor, configured to decode the broadcast signal.

\* \* \* \* \*

UNITED STATES PATENT AND TRADEMARK OFFICE
CERTIFICATE OF CORRECTION

PATENT NO.         : 11,039,186 B2
APPLICATION NO.    : 16/462823
DATED              : June 15, 2021
INVENTOR(S)        : Seungryul Yang et al.

It is certified that error appears in the above-identified patent and that said Letters Patent is hereby corrected as shown below:

In the Claims

Column 34, Line 45, of Claim 1, replace "a broadcast signal" with --broadcast signals--.
Column 34, Line 49, of Claim 1, replace "the broadcast signal" with --a broadcast signal--.
Column 34, Lines 60-61, of Claim 1, replace "a broadcast signal" with --broadcast signals--.
Column 35, Line 11, of Claim 1, replace "a_portion" with --a portion--.
Column 36, Line 6, of Claim 6, replace "the broadcast signal" with --a broadcast signal--.
Column 36, Lines 17-18, of Claim 6, replace "a broadcast signal" with --broadcast signals--.
Column 37, Line 27, of Claim 11, replace "a broadcast signal" with --broadcast signals--.
Column 37, Lines 29-30, of Claim 11, replace "a broadcast signal" with --broadcast signals--.
Column 37, Line 33, of Claim 11, replace "the broadcast signal" with --a broadcast signal--.
Column 38, Line 10, of Claim 11, replace "the broadcast signal" with --the broadcast service--.
Column 38, Line 15, of Claim 12, replace "a broadcast signal" with --broadcast signals--.
Column 38, Lines 18-19, of Claim 12, replace "the broadcast signal" with --a broadcast signal--.
Column 38, Lines 56-57, of Claim 12, replace "the broadcast signal" with --the broadcast service--.

Signed and Sealed this
Thirty-first Day of January, 2023

Katherine Kelly Vidal
*Director of the United States Patent and Trademark Office*